(12) United States Patent
Autry et al.

(10) Patent No.: US 12,456,616 B1
(45) Date of Patent: Oct. 28, 2025

(54) ION TRAP FOR ATOMIC CLOCKS, MASS SPECTROMETRY, ATOMIC SENSING, AND QUANTUM COMPUTING

(71) Applicant: HRL Laboratories, LLC, Malibu, CA (US)

(72) Inventors: Travis Autry, Calabasas, CA (US); Justin Christensen, Simi Valley, CA (US); Ian Counts, Santa Monica, CA (US); Zachary Chin, Lake Zurich, CA (US); Jennifer Ellis, Calabasas, CA (US); Christopher Roper, Oak Park, CA (US); Danny Kim, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 445 days.

(21) Appl. No.: 18/111,641

(22) Filed: Feb. 20, 2023

(51) Int. Cl.
   *H01J 49/42* (2006.01)
   *G06N 10/20* (2022.01)
   (Continued)

(52) U.S. Cl.
   CPC .......... *H01J 49/4225* (2013.01); *G06N 10/20* (2022.01); *G06N 10/70* (2022.01); *H01J 49/0004* (2013.01); *H01J 49/24* (2013.01)

(58) Field of Classification Search
   CPC .... H01J 49/0004; H01J 49/4225; H01J 49/24; G06N 10/20; G06N 10/70
   See application file for complete search history.

(56) References Cited

U.S. PATENT DOCUMENTS

| 3,578,834 A | 5/1971 | Porta et al. |
| 4,495,478 A | 1/1985 | Kwon et al. |

(Continued)

FOREIGN PATENT DOCUMENTS

| WO | 1997012298 A1 | 4/1997 |
| WO | 2000049732 A1 | 8/2000 |
| WO | 2000043842 A2 | 2/2001 |

OTHER PUBLICATIONS

Kanai and Hasegawa, "A Radio Frequency Ion Trap With String Electrodes", Review of Scientific Instruments 89 023106 (2018)) ( Year: 2018).*

(Continued)

*Primary Examiner* — David E Smith
(74) *Attorney, Agent, or Firm* — O'Connor & Company; Ryan P. O'Connor

(57) ABSTRACT

The disclosed ion trap comprises a plurality of structurally continuous blades and a plurality of recessed control electrodes, wherein the plurality of structurally continuous blades includes at least two structurally continuous RF blades and at least two structurally continuous DC blades, wherein the recessed control electrodes are disposed on or within the structurally continuous blades, and wherein the ion trap is in a ring configuration. The ion trap enables fast readout of optical transitions using stationary laser beams and moving ions. This design fundamentally contrasts with traditional linear Paul traps that employ stationary ions and laser beams that are turned on or off. Because the RF and DC blades are structurally continuous, the trapping potential is continuous and harmonic. Instead of segmenting the blades as conventionally, segmented recessed control electrodes are utilized to reduce voltage noise that causes unwanted heating of the ions. Many benefits and commercial uses are described.

36 Claims, 9 Drawing Sheets

(51) Int. Cl.
  *G06N 10/70* (2022.01)
  *H01J 49/00* (2006.01)
  *H01J 49/24* (2006.01)

(56) References Cited

U.S. PATENT DOCUMENTS

| | | |
|---|---|---|
| 5,192,921 A | 3/1993 | Chantry et al. |
| 7,126,112 B2 | 10/2006 | Anderson et al. |
| 8,009,520 B2 | 8/2011 | Jau et al. |
| 8,258,884 B2 | 9/2012 | Borwick, III et al. |
| 8,624,682 B2 | 1/2014 | Ridley et al. |
| 8,999,123 B2 | 4/2015 | Bernstein et al. |
| 9,064,942 B2 | 6/2015 | Bangsaruntip et al. |
| 9,077,354 B2 | 7/2015 | Strabley et al. |
| 9,685,483 B2 | 6/2017 | Nazarian et al. |
| 9,763,314 B1 | 9/2017 | Roper et al. |
| 9,837,177 B1 | 12/2017 | Roper et al. |
| 10,056,913 B1 | 8/2018 | Roper et al. |
| 10,545,461 B1 | 1/2020 | Roper et al. |
| 10,775,748 B1 | 9/2020 | Roper et al. |
| 10,828,618 B1 | 11/2020 | Roper et al. |
| 11,056,332 B1 * | 7/2021 | Maunz ............... H01J 49/0018 |
| 2011/0247942 A1 | 10/2011 | Bernstein et al. |
| 2014/0227548 A1 | 8/2014 | Myrick |
| 2015/0226669 A1 | 8/2015 | Compton |
| 2021/0343939 A1 * | 11/2021 | Brown ................... G11C 11/54 |
| 2023/0076629 A1 | 3/2023 | Autry et al. |
| 2023/0273074 A1 * | 8/2023 | Dietl ........................ G01K 7/18 |
| | | 374/185 |
| 2024/0203723 A1 * | 6/2024 | Brandl .................. G06N 10/00 |
| 2024/0312664 A1 * | 9/2024 | Auchter ................ G21K 1/087 |

OTHER PUBLICATIONS

Eschner et al., "Laser cooling of trapped ions", J. Opt. Soc. Am. B, vol. 20, No. 5, May 2003.

Herschbach et al., "Linear Paul trap design for an optical clock with Coulomb crystals", Appl Phys B (2012) 107:891-906.

Kanai et al., "A radio-frequency ion trap with string electrodes", Review of Scientific Instruments 89, 023106 (2018).

Kaushal et al., "Shuttling-Based Trapped-Ion Quantum Information Processing", AVS Quantum Sci. 2, 014101 (2020).

McFerran et al., "Fractional frequency instability in the $10\hat{0}$-14 range with a thermal beam optical frequency reference", J. Opt. Soc. Am. B, vol. 27, No. 2, Jan. 22, 2010.

Schmidt et al., "Mass-selective removal of ions from Paul traps using parametric excitation", Appl Phys B. 2020; 126(11): 176.

* cited by examiner

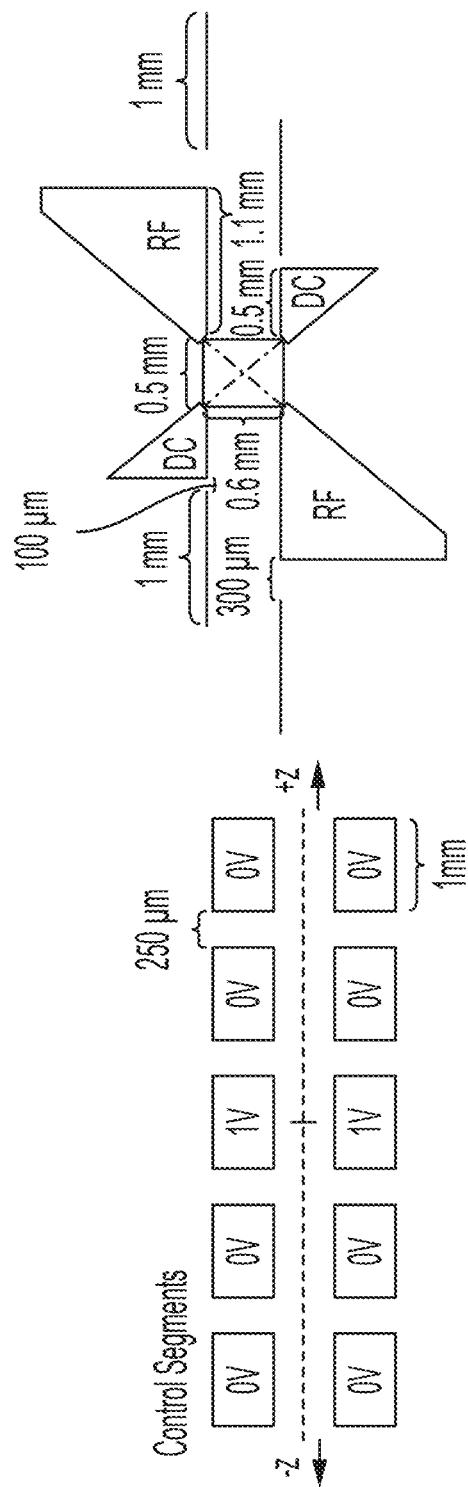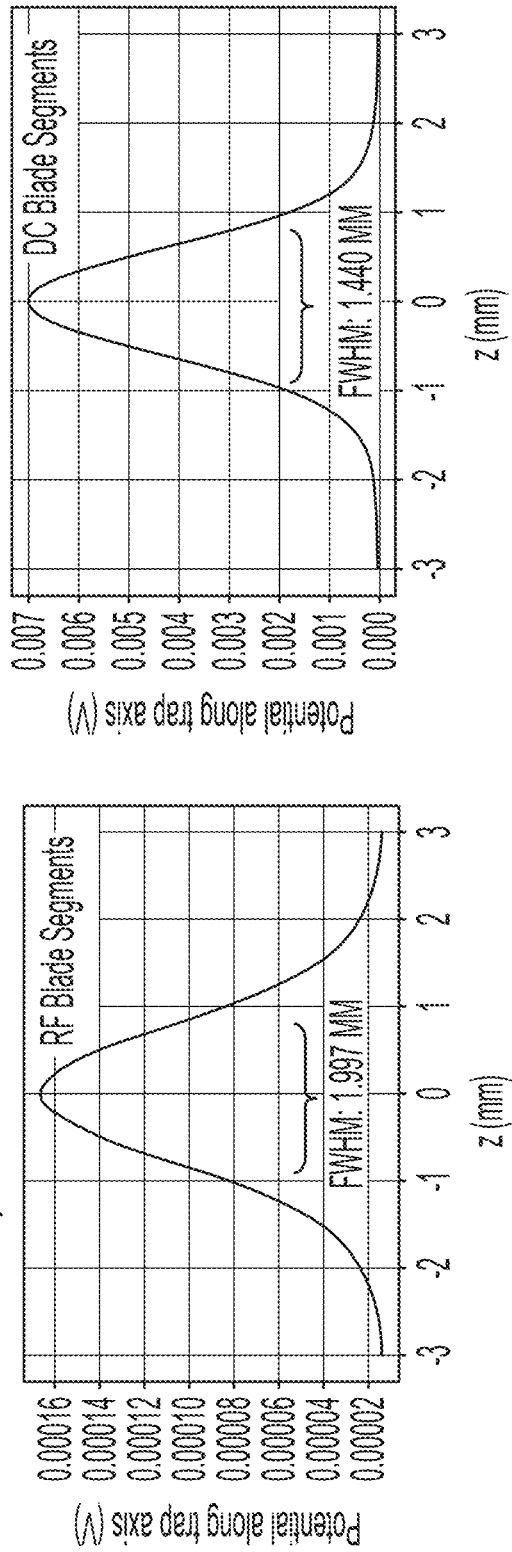
FIG. 4

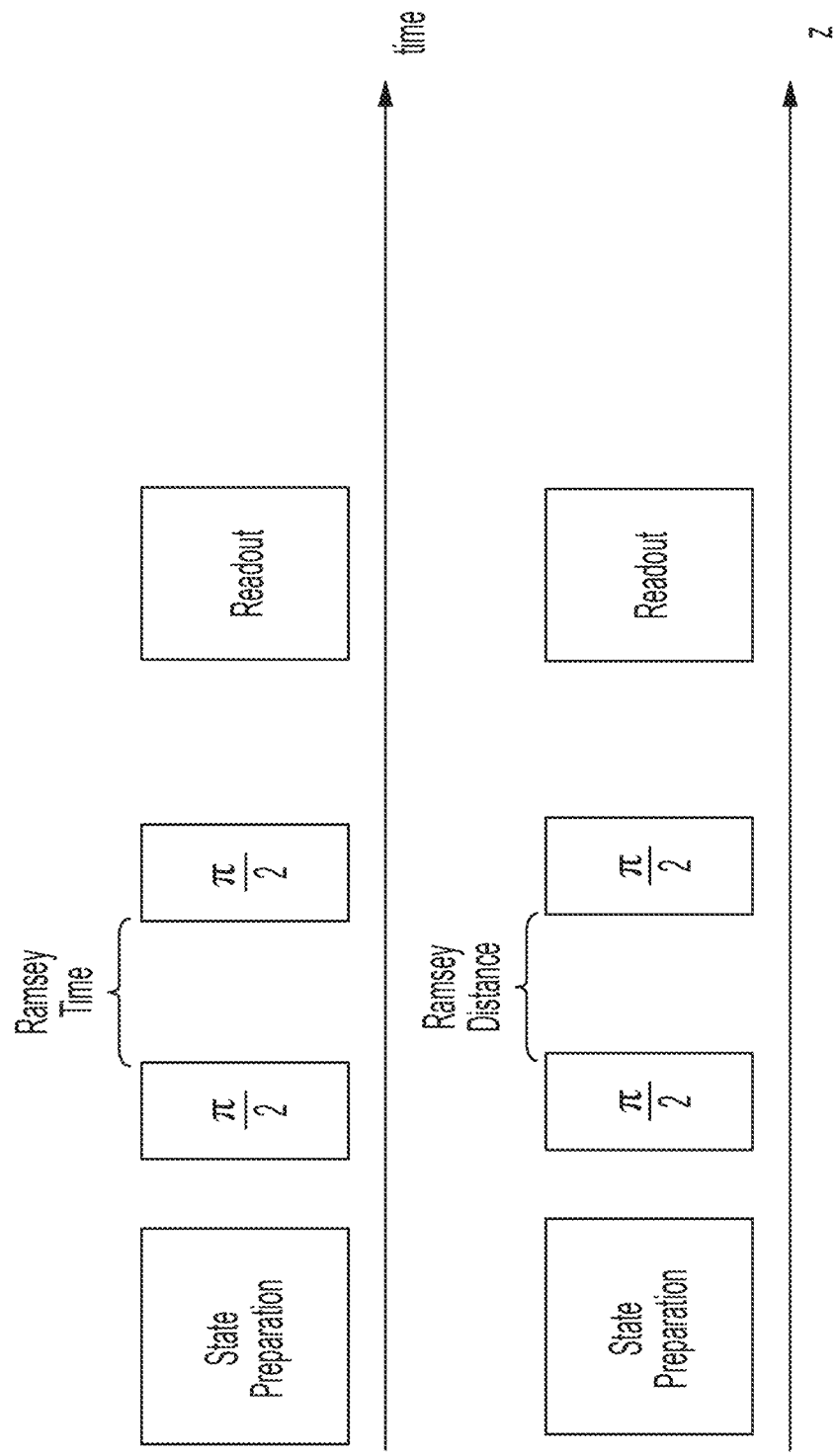

ION TRAP FOR ATOMIC CLOCKS, MASS SPECTROMETRY, ATOMIC SENSING, AND QUANTUM COMPUTING

FIELD OF THE INVENTION

The present invention generally relates to the management of ions for atomic clocks, mass spectrometry, atomic sensing, and quantum computing.

BACKGROUND OF THE INVENTION

Frequency standards are devices for producing or probing frequencies. Optical frequency standards refer to stable optical frequencies, and are generated by optical atomic clocks and optical cavities. Frequency standards are useful in optical fiber communications, timing, radio frequency (RF) photonics, and inertial sensing as well as other technologies. Application areas of ultraprecise optical frequency standards include high-precision laser spectroscopy, miniature atomic instruments (e.g. atomic clocks and gyroscopes), global positioning systems, precision laser sensing (e.g., remote nuclear blast detection), and ultra-stable oscillators for high-speed analog-digital converters and radar systems.

An active optical frequency standard is a laser source emitting light with a very well-defined and known optical frequency (e.g., stabilized HeNe laser). A passive optical frequency standard is a passive device with a well-defined frequency response, which can be used to build an active standard. Important examples are high-quality-factor reference cavities and devices such as multi-pass gas cells for probing certain optical transitions.

An optical frequency standard is usually based on some optically probed electronic transition (generally a dipole-forbidden but quadrupole-allowed transition) with a narrow frequency bandwidth of atoms (e.g. Ca, Rb, Sr, Yb, Mg, or H), ions (e.g., $Hg^+$, $Sr^+$, $Yb^+$, $Ba^+$, $In^+$, or $Al^+$), or molecules (e.g., $CH_4$ or $I_2$). This electronic transition is used to stabilize the frequency of a single-frequency laser to the electronic transition frequency of the atom, ion, or molecule. In order to reduce inhomogeneous broadening by thermal movement and collisions, the particles may be retained in a trap within a vacuum chamber along with laser cooling. This conventional set-up allows for precise spectroscopic measurements on the clock transition.

Papers describing frequency references include McFerran et al., "Fractional frequency instability in the $10^{-14}$ range with a thermal beam optical frequency reference", *J. Opt. Soc. Am. B*, 27, 277-285 (2010); Norcia et al., "Frequency Measurements of Superradiance from the Strontium Clock Transition", *Phys. Rev. X*8, 021036 (2018); Davila-Rodriguez et al., "Compact, thermal-noise-limited reference cavity for ultra-low-noise microwave generation", *Opt. Lett.* 42, 1277-1280 (2017); Matei et al., "1.5 m Lasers with Sub-10 mHz Linewidth", *Phys. Rev. Lett.* 118, 263202 (2017); Kessler et al., "A sub-40-mHz-linewidth laser based on a silicon single-crystal optical cavity", *Nature Photonics* 6, 687-692 (2012); Cook et al., "Laser-Frequency Stabilization Based on Steady-State Spectral-Hole Burning in $Eu^{3+}$: $Y_2SiO_5$", *Phys. Rev. Lett.* 114, 253902 (2015); and Olson et al., "Ramsey-Bordé Matter-Wave Interferometry for Laser Frequency Stabilization at $10^{-16}$ Frequency Instability and Below", *Phys. Rev. Lett.* 123, 073202 (2019), each of which is hereby incorporated by reference.

Highly accurate optical frequency references play an important role in many applications. Optical frequency references with better performance than commercially available standards are desired, to enable high-precision spectroscopy at multiple locations, for example. In general, known frequency references are either extremely precise at the cost of massive size, weight, and power, or they sacrifice performance for reduced size, weight, and power. Large optical cavity-based frequency references are currently the standard for generating an optical frequency reference at short averaging times. At longer averaging times, optical atomic clocks are used.

Ion traps are important components in optical frequency references and other devices. Papers describing ion traps include Deslauriers et al., "Zero-point cooling and low heating of trapped $Cd^+111$ ions", *Physical Review A* 70.4 (2004): 043408; Madsen et al., "Planar ion trap geometry for microfabrication", *Applied Physics B* 78.5 (2004): 639-651; Stick et al., "Ion trap in a semiconductor chip.", *Nature Physics* 2.1 (2006): 36-39; McLoughlin et al., "Versatile ytterbium ion trap experiment for operation of scalable ion-trap chips with motional heating and transition-frequency measurements", *Physical Review A* 83.1 (2011): 013406; Siverns et al., "Ion trap architectures and new directions", Quantum Information Processing 16.12 (2017): 314; and Xie et al., "An open-endcap blade trap for radial-2D ion crystals", *Quantum Science and Technology* Volume 6, Number 4 (2021), each of which is hereby incorporated by reference.

In view of the state of the art, there is a desire for improved ion traps. In particular, there is a long-felt need for a compact, ultra-stable, atom-based frequency reference with a recirculating ion beam.

SUMMARY OF THE INVENTION

The present invention addresses the aforementioned needs in the art, as will now be summarized and then further described in detail below.

In some variations, an ion trap comprises a plurality of structurally continuous blades and a plurality of recessed control electrodes that are capable of controlling ions, wherein the plurality of structurally continuous blades includes at least two structurally continuous RF blades and at least two structurally continuous DC blades, wherein the recessed control electrodes are disposed on or within the structurally continuous blades, and wherein the ion trap is in a ring configuration.

In some embodiments, the ring configuration is a racetrack configuration. The racetrack configuration may contain two or more straightaway sections connected in a loop by rounded end sections.

In some embodiments, the plurality of structurally continuous blades is four structurally continuous blades consisting of two structurally continuous RF blades and two structurally continuous DC blades.

Two of the plurality of structurally continuous blades may have blade tips with a blade-tip distance therebetween from about 1 micron to about 1 centimeter. In certain embodiments, the blade-tip distance is from about 10 microns to about 1 millimeter.

In some embodiments, the structurally continuous blades are created from printed-circuit-board wafers, ceramic wafers, semiconducting wafers, insulating wafers, glass, or a combination thereof.

In some embodiments, the ion trap has a trap length from about 1 millimeter to about 1 meter. In certain embodiments, the trap length is from about 1 centimeter to about 100 centimeters.

In some embodiments, the ions are present and are in continuous transport within the ion trap around the ring configuration. In some embodiments, the ions are present and are stationary as cool ions within the ion trap. In other embodiments, the ions are not yet present, or are no longer present.

In some embodiments, the ions are positive ions with a charge of +1. Positive ions may be selected from the group consisting of $Ca^+$, $Sr^+$, $Ba^+$, $Yb^+$, isotopes thereof, and combinations of the foregoing, for example. In certain embodiments, the ions are positive ions with a charge of +2 or greater.

In some embodiments, the ions are negative ions with a charge of −1. Negative ions may be $S^-$ or $Se^-$, for example. In certain embodiments, the ions are negative ions with a charge of −2 or more negative.

In some embodiments, the ion trap is configured to interrogate internal electronic, vibrational, and/or spin states of the ions via lasers.

In some embodiments, the ion trap further comprises at least two probe lasers. In typical embodiments, the ion trap comprises multiple (e.g., four) probe lasers. In some embodiments, at least two probe lasers are configured for Ramsey spectroscopy of the ions.

In some embodiments, the ion trap further comprises at least one cooling laser configured to cool the ions.

In some embodiments, the ion trap further comprises at least one laser configured for electron shelving. A laser may be a readout laser configured to determine a ground-state population of the ions.

In some embodiments, the ion trap further comprises an ion collimator configured to form a collimated beam of the ions.

In some embodiments, the ion trap further comprises an atom source configured to supply neutral atoms to be ionized. Optionally, the ion trap may further comprise an ionizer configured to excite neutral atoms in the atom source to form the ions. The ionizer may be an optical ionizer or an electrical ionizer. The atom source may be a solid-state electrochemical atom source.

In some embodiments, the ion trap further comprises an ion sink, such as an ion sink is configured to collect ions exiting a ring ion trap. The ion sink may be a solid-state electrochemical ion sink.

In some embodiments, the ion trap further comprises an imaging system. The imaging system may be configured to focus fluorescence from the ions, for example.

In some embodiments, the ion trap is disposed within a vacuum chamber. When an ion sink is present, the ion sink is preferably disposed within the vacuum chamber.

Some variations provide a method of continuous ion shuttling, the method comprising:
(a) selecting ions to be shuttled;
(b) providing two counterpropagating laser beams, wherein each of the two counterpropagating laser beams is red-detuned with respect to an optical transition for Doppler cooling the ions;
(c) Doppler cooling the ions via absorption/emission of red-detuned photons;
(d) providing a force on the ions via the absorption/emission of red-detuned photons; and
(e) red-detuning the two counterpropagating laser beams by different amounts, thereby applying a differential force on the ions to continuously shuttle the ions.

In some variations, a method of continuous ion trapping comprises:
(a) creating an atomic vapor;
(b) ionizing at least some atoms in the atomic vapor, to form ionized atoms;
(c) trapping the ionized atoms in an ion trap, to form trapped ions, wherein the ion trap preferably comprises a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration;
(d) optionally, illuminating some of the ionized atoms with a cooling laser;
(e) illuminating at least some of the ionized atoms with a first probe laser at a first-probe-laser frequency;
(f) illuminating at least some of the ionized atoms with a second probe laser at a second-probe-laser frequency;
(g) adjusting the first-probe-laser frequency and the second-probe-laser frequency using Ramsey spectroscopy to an S→D transition of at least some of the ionized atoms;
(h) illuminating at least some of the ionized atoms with a readout laser to determine a ground-state population of the ionized atoms;
(i) optionally, illuminating at least some of the ionized atoms with a third probe laser; and
(j) optionally, illuminating at least some of the ionized atoms with a fourth probe laser after step (i), if conducted.

The present invention also provides an atomic clock that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration.

The present invention also provides an atomic sensor that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration.

The present invention also provides a mass spectrometer that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration.

The present invention also provides a quantum computer that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration. Preferably, the quantum computer is an error-corrected quantum computer.

BRIEF DESCRIPTION OF THE DRAWINGS

FIG. 4 depicts a SIMION simulation with a layout of electrode control segments disposed on RF and DC blades, and a projection of electrode control segments on the trap z axis of the RF and DC blades.

FIG. 5 depicts a time-domain illustration of a pulse sequence, and a spatial domain illustration of a temporal pulse sequence to the atoms.

DETAILED DESCRIPTION OF EMBODIMENTS OF THE INVENTION

Figure 1:
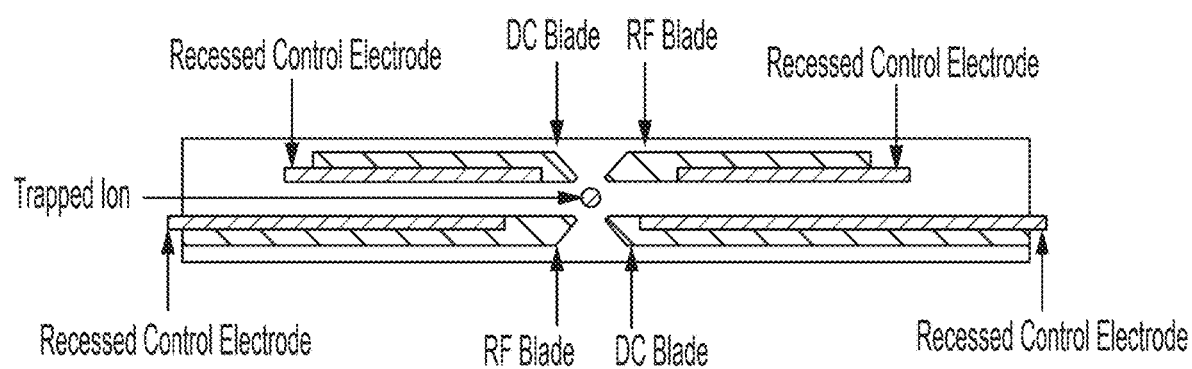
FIG. 1 illustrates an exemplary ion trap (side view).

The apparatus, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

The present invention provides a device (synonymously, an ion trap) for the control of trapped ions, such as storage and/or circulation of trapped ions. Some variations are based on the principle of ionizing radiation from an electron beam, an optical beam, or another type of beam (proton, neutron, etc.) which ionizes atoms or molecules to form ionized particles. When particles are ionized in the disclosed ion trap, the ions become confined in three dimensions by the combination of AC and DC electric fields applied to ion-trap blades. Additionally, control voltages can be applied to recessed control electrodes, enabling the manipulation of the ions, referred to as ion "shuttling". The DC voltage on the blades can be ramped, making the trapping criteria unstable, in which case the ion trap can operate as a time-of-flight mass spectrometer.

Some variations are premised on modifications to a linear quadrupole Paul trap. Conventionally, Paul traps operate in a straight line with four segmented blades or rods. When operated with a stable combination of RF frequency, RF amplitude, and DC voltage, the Paul trap structure creates a harmonic potential well that causes an ion to oscillate in between the blades, thereby effectively "trapping" the ion. See Schmidt et al., "Mass-selective removal of ions from Paul traps using parametric excitation" *Applied Physics B* 126(11): 176 (2020), which is hereby incorporated by reference (hereinafter, "Schmidt"). In a conventional Paul trap, according to Schmidt, two RF electrodes provide dynamical radial confinement while a set of segmented DC electrodes controls the electrostatic axial confinement along z as well as radial electric fields. This explains why the DC electrodes are always segmented in the prior art. FIG. 4 of Schmidt shows notches, not structurally continuous RF blades, and Schmidt teaches that the RF electrodes feature slits symmetrically opposed to the gaps between the segments in the DC electrodes.

By contrast, in the present invention, a conventional linear Paul trap is significantly improved to provide a storage "ring" Paul trap in which the blades are curved around in a ring configuration. This configuration can provide many benefits.

First, the length of the vacuum chamber in the axial (long) direction is greatly reduced, allowing a more compact experimental footprint. To the knowledge of the inventors, a compact RF-blade ring Paul trap has never been achieved or disclosed on a micro-scale. The significant reduction of the footprint of a traditional 4-blade trap enables maintaining a deep trapping potential to relax vacuum pressure requirements and background or near-surface heating of ions.

Second, ion shuttling can be accomplished with either DC segments or with an optical molasses, or a combination thereof, permitting heating-free shuttling of ions. An engineered RF-Paul trap that confines cooled ions to a ring which can be rotated via optical molasses, significantly reduces complexity, fast electronics, feedback loops, and software requirements.

Third, continuous shuttling with a compact ring configuration allows for ions in different regions of the trap to be participating in different parts of the experimental cycle at the same moment in time, with every ion always participating.

Fourth, placement of control electrodes behind the RF/DC blades—as opposed to segmenting the blades (current state of art)—provides a voltage noise filter that removes voltage fluctuation noise on the RF trap potential while maximizing optical access. Recessed electrode segments provide electric field trapping and control at the trap center without causing perturbations in the confining field due to blade segmentation, in addition to maintaining good optical access.

Common to many practical applications of the disclosed ion trap is fast readout of optical transitions enabled by stationary laser beams and moving ions. This design fundamentally contrasts with traditional linear Paul traps that employ stationary ions and laser beams that are turned on or off. To date, linear Paul traps segment the actual confining blades, which creates non-ideal trapping potentials in order to realize shuttling. This conventional configuration perturbs the trapping potential and adds electric field noise because the segments have DC voltage fluctuations from a standard digital-to-analog converter ("DAC"). When instead the control electrodes are recessed as disclosed herein, the resulting physical signal-to-noise ratio can be as high as 150:1 (or more) for the continuous DC blades and as high as 6000:1 (or more) for the continuous RF blades.

These components of the trap combine to result in a fieldable (~1-10 cm long in some embodiments) ion trap with low trap noise, good trapping potential, and excellent optical access, recirculating ions in a new mode of operation for miniature ion traps. A compact ion trap allows ions to recirculate, thereby allowing for continuous shuttling/transport of ions through the trap. There is no need to reload or change shuttling direction. The ion trap maintains a high trapping potential (e.g., >1 eV, such as about 2 eV) and low trap noise from DAC voltage fluctuations.

The present invention, in various embodiments, has multiple benefits over prior and state-of-art ion traps. The ion trap can achieve deep trapping depths of ~2 eV, which is ~100× larger than surface traps and comparable to 3D traps. The ion trap does not require cryogenic operation, as is usually required with surface traps. The ion trap can be loaded with ions once, with the anticipation that once trapped, the ions will stay trapped for days, weeks, months, or even years. By recycling cooled ions, the readout scheme becomes more robust.

Because the RF and DC blades are structurally continuous, the trapping potential is continuous and harmonic. Prior designs of 3D linear Paul traps segmented the blades in order to create electrical control. Instead of segmenting the blades, segmented recessed control electrodes—situated on or within the blades—are utilized to reduce voltage noise that causes unwanted heating of the ions.

Integration with a solid-state electrochemical atomic beam source can reduce size, weight, and power ("SWaP") since an electrochemical atomic beam source is smaller and more power-efficient, and can provide a collimated beam, when compared to conventional atomic ovens.

In some variations, an ion trap comprises a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration.

In this specification, an "ion" is an ionized atom or molecule, and is not an isolated electron. The charge on the ion may be negative or positive.

The structurally continuous blades and the recessed control electrodes, collectively, are capable of controlling ions. The ions may be controlled such that the ions are stored indefinitely, or the ions may be controlled such that the ions are recirculated around the ring for an arbitrary period of time, for example. The location in which the ions are controllably stored is referred to as a "trapping region" which is ordinarily in a space between the tips of the structurally continuous DC and RF blades (see FIG. 1). It is possible for ions to become stored (e.g., intercalated) within the material of the DC or RF blades, or even the control electrodes, due to diffusion away from the desired trapping region.

The structurally continuous blades are physically continuous around the entire length of the ring ion trap. The structurally continuous blades are not segmented as in the prior art. Typically, the structurally continuous blades are parallel or substantially parallel with each other, such as depicted in FIG. 1. The recessed control electrodes are described in detail later in the specification.

In some embodiments, the ring configuration is a racetrack configuration. The racetrack configuration may contain two or more straightaway sections connected in a loop by rounded end sections. The number of straightaway sections may be 2, 3, 4, 5, 6, or more, each connected in a loop by rounded end sections. A racetrack is a subclass of ion traps that have a continuous axial degree of freedom.

Figure 7:
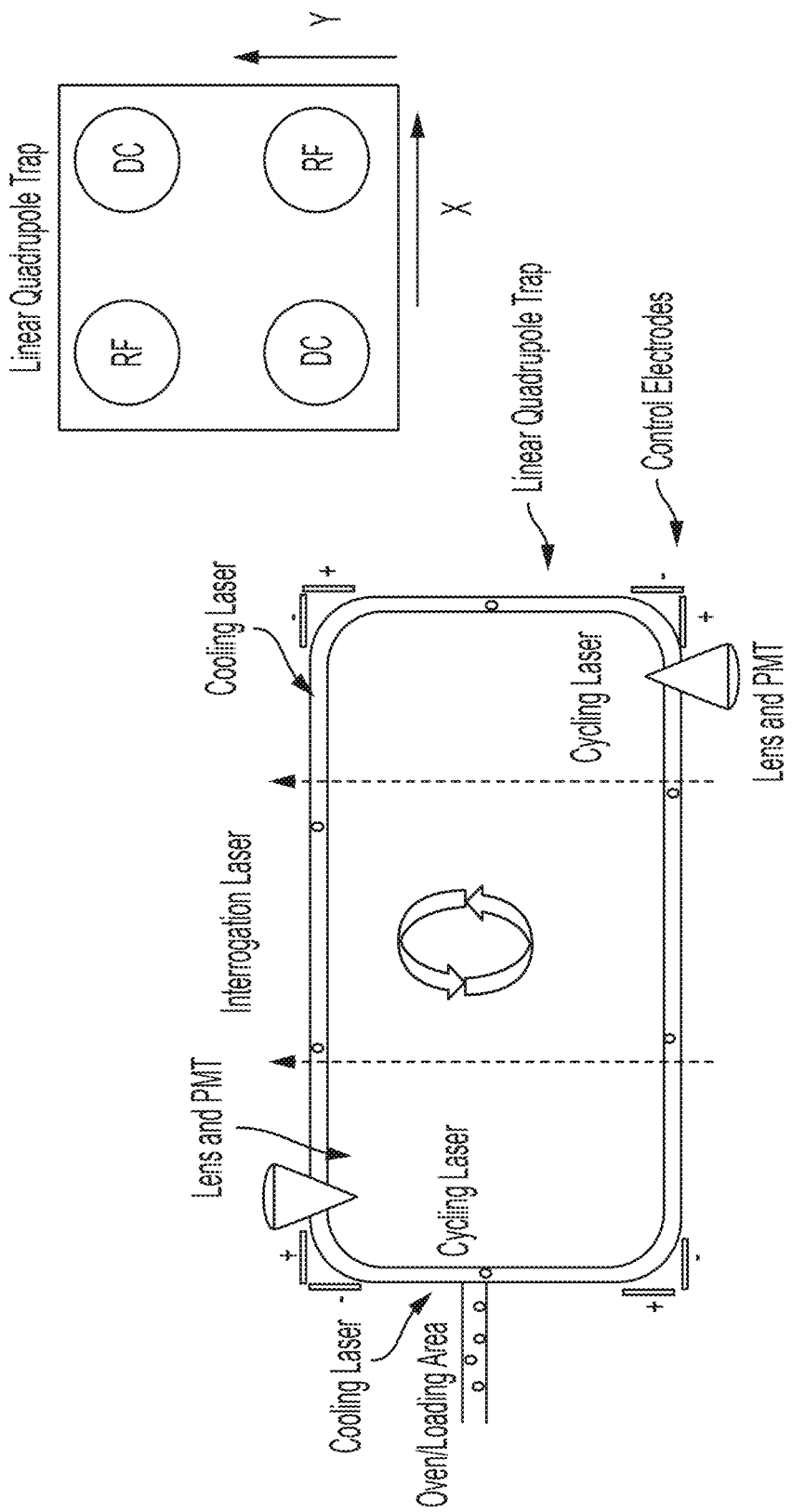
FIG. 7 illustrates an exemplary ion trap (top view), depicting a ring configuration, control electrodes, and lasers used to control the ions.

The ring configuration may be a rounded square, a rounded rectangle, an octagon, or another polygon, such as a polygon with many straightaway sections, but without sharp turning points. The ring configurations of FIGS. 3 and 7 may be considered to have 2 straightaway sections (the long straight sections), although if the short straight sections are designed to be long enough, then 4 straightaway sections may be present. A racetrack configuration may have a serpentine geometry with at least two straightaway sections that are connected by rounded sections to avoid discontinuities.

In preferred embodiments, the plurality of structurally continuous blades is four structurally continuous blades consisting of two structurally continuous RF blades and two structurally continuous DC blades, forming a quadrupole trap. In other embodiments, the plurality of structurally continuous blades is eight structurally continuous blades consisting of four structurally continuous RF blades and four structurally continuous DC blades, forming an octupole trap.

In some embodiments, two of the plurality of structurally continuous blades (i.e., adjacent blades) have blade tips with a blade-tip distance therebetween from about 1 micron to about 1 centimeter. In certain embodiments, the blade-tip distance is from about 10 microns to about 1 millimeter. In various embodiments, the blade-tip distance is about, at least about, or at most about 1 micron, 2 microns, 5 microns, 10 microns, 25 microns, 50 microns, 100 microns, 200 microns, 300 microns, 400 microns, 500 microns, 600 microns, 700 microns, 800 microns, 900 microns, 1 millimeter, 2 millimeters, 3 millimeters, 4 millimeters, 5 millimeters, 6 millimeters, 7 millimeters, 8 millimeters, 9 millimeters, or 10 millimeters, including any intervening range.

In some embodiments, the structurally continuous blades are created from printed-circuit-board wafers, ceramic wafers, semiconducting wafers, insulating wafers, glass, or a combination thereof. The ion trap may be manufactured using laser micromachining for each of the structurally continuous blades and then precisely bonding (e.g., using an aligner and die-bonder tool) each of the blades into the desired position. Alternatively, the blades may be made in pairs (2 at a time), or 3 or 4 at a time, for example. Alternatively, sections of each blade may be made individually and assembled. In various embodiments, laser micromachining, micro electrodischarge machining (EDM), wet chemical etching, plasma etching (e.g., in a microelectromechanical process), or micromechanical milling may be used to fabricate the blades.

In some embodiments, the blades are fabricated separately from printed circuit boards containing the control electrodes. Alternatively, printed circuit boards containing the control electrodes may be machined by one of the above methods (e.g., laser micromachining) to yield a sharp blade (or blades) on one or more edges. In other embodiments, the control electrodes are added, such as via lithography or shadow-masked evaporation, to a machined part already containing blades. In these embodiments, the electrodes are preferably added in a recessed region so that there is no, or minimal, view factor to the trapped ions during operation.

In some embodiments, the ion trap has a trap length from about 1 millimeter to about 1 meter. In certain embodiments, the trap length is from about 1 centimeter to about 100 centimeters. In various embodiments, the trap length is about, at least about, or at most about 1 millimeter, 5 millimeters, 10 millimeters, 25 millimeters, 50 millimeters, 100 millimeters, 25 centimeters, 50 centimeters, or 100 centimeters, including any intervening range.

In some embodiments, the ions are present and are in continuous transport within the ion trap around the ring configuration. In some embodiments, the ions are present and are stationary as cool ions within the ion trap. In other embodiments, the ions are not yet present, or are no longer present.

In preferred embodiments, an ion is selected such that it has a dipole-forbidden but quadrupole-allowed optical transition. For example, the $4^2S_{1/2} \rightarrow 3^2D_{5/2}$ transition in the $Ca^+$ ion is well-known as a dipole-forbidden but quadrupole-allowed transition.

In some embodiments, the ions are positive ions with a charge of +1. Positive ions may be selected from the group consisting of $Ca^+$, $Sr^+$, $Ba^+$, $Yb^+$, isotopes thereof, and combinations of the foregoing, for example. Many other positive ions are possible as well, including (but by no means limited to) $Hg^+$, $In^+$, and $H^+$. In certain embodiments, the ions are positive ions with a charge of +2 or greater, such as $Ca^{2+}$ or $Sr^{2+}$. Positive ions may be an ionized form of a diatomic gas, such as $N_2^+$, for example.

In some embodiments, the ions are negative ions with a charge of −1. Negative ions may be $S^-$ or $Se^-$, for example. In certain embodiments, the ions are negative ions with a charge of −2 or more negative, such as $S^{2-}$ or $O^{2-}$.

In some embodiments, the ion trap is configured to interrogate internal electronic, vibrational, and/or spin states of the ions via lasers.

In some embodiments, the ion trap further comprises at least two probe lasers. In typical embodiments, the ion trap comprises four probe lasers. In some embodiments, at least two probe lasers are configured for Ramsey spectroscopy of the ions.

In some embodiments, the ion trap further comprises at least one cooling laser configured to cool the ions.

In some embodiments, the ion trap further comprises at least one laser configured for electron shelving. A laser may be a readout laser configured to determine a ground-state population of the ions.

In some embodiments, the ion trap further comprises an ion collimator configured to form a collimated beam of the ions.

In some embodiments, the ion trap further comprises an atom source configured to supply neutral atoms to be ionized. Optionally, the ion trap may further comprise an ionizer configured to excite neutral atoms in the atom source to form the ions. The ionizer may be an optical ionizer or an electrical ionizer. The atom source may be a solid-state electrochemical atom source.

In some embodiments, the ion trap further comprises an ion sink, such as an ion sink is configured to collect ions exiting a ring ion trap. The ion sink may be a solid-state electrochemical ion sink.

In some embodiments, the ion trap further comprises an imaging system. The imaging system may be configured to focus fluorescence from the ions, for example.

In some embodiments, the ion trap is disposed within a vacuum chamber. When an ion sink is present, the ion sink is preferably disposed within the vacuum chamber.

The disclosed ion trap enables a new method of ion shuttling—continuous rather than discrete shuttling, in some embodiments. Discrete shuttling requires the complicated control of the DC segments in order to control the trap potential. By lowering or raising trap barriers, the ions can be forced to move. This action typically causes the ions to be heated. By contrast, in continuous shuttling utilizing a configuration as disclosed, two counterpropagating laser beams can control the ion motion. Individually, each laser is red-detuned with respect to a strong optical transition used for Doppler cooling the ions. The absorption/emission of these red-detuned photons by the ions results in the ion temperature being strongly cooled while also providing a small recoil force in the direction opposite the cooling beam. If these lasers are each red-detuned by a different amount, then a differential force may be applied to the ions, which simultaneously cools them and allows the ions to be moved through the ion trap in a controlled fashion.

Some variations provide a method of continuous ion shuttling, the method comprising:
  (a) selecting ions to be shuttled;
  (b) providing two counterpropagating laser beams, wherein each of the two counterpropagating laser beams is red-detuned with respect to an optical transition for Doppler cooling the ions;
  (c) Doppler cooling the ions via absorption/emission of red-detuned photons;
  (d) providing a force on the ions via the absorption/ emission of red-detuned photons; and
  (e) red-detuning the two counterpropagating laser beams by different amounts, thereby applying a differential force on the ions to continuously shuttle the ions.

This invention is applicable to portable atomic instruments, mass spectrometers, sensors, and lasers, for example. Current electronic-warfare systems would benefit from highly stable local oscillators which would enable analog-digital converters to operate at higher frequency and with more bits. Similarly, radar systems benefit from lower local oscillator noise, enabling the detection of slow-moving objects and for SAR at higher or geosynchronous orbit. There is a need for ultra-narrow lasers for standoff forensic seismology (blast detection) using underwater fiber optic cables. Additionally, there is a need for miniature mass spectrometers for placement on a drone (for example) for trace gas analysis on battlefields or hospitals, or on space vehicles for exploration of planets, moons, or asteroids.

Various practical applications of the ion trap will now be described, without limitation of the scope of the invention.

The present invention provides an atomic clock that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration.

An optical atomic clock relies on readout of ions via Ramsey spectroscopy. The readout rate depends on the ion loading time, cooling time, state-preparation time, Ramsey interrogation time, and readout time. In a traditional linear Paul trap, each of these events occurs at a single point in space but at different points in time with respect to the same ion. Continuously shuttling in a storage ring changes this paradigm, such that the sequences occur at the same point in time but at different points in space on different ions. Since all ions of a given isotope are equivalent, the continuous shuttling provides much faster readout of the optical atomic clock, effectively reducing the clock duty cycle. In addition, continuous shuttling in a ring does not require reloading of new ions, both reducing power requirements and improving longevity of the atomic source.

As a storage ring, the ion trap may be used to study and perform optical spectroscopy and mass spectroscopy on trapped particles that are difficult to generate, such as antihydrogen (antimatter form of hydrogen) containing a positron ($e^+$) and an antiproton ($p^-$).

As a quantum computing unit, the internal states of trapped ions are excellent qubits (quantum bits). With a ring configuration, control of thousands of ions can be realized, enabling the existing noisy intermediate-scale quantum devices to be improved to full error-corrected quantum computers. Quantum errors due to decoherence and other quantum noise pose real challenges for quantum computing. In some embodiments, rather than shuttling ions over a complicated quantum charge-coupled device ("QCCD") or using photonic interlinks as in a modular universal scalable trapped ion quantum computer ("MUSIQC"), a ring-based quantum computer is enabled using stationary laser beams with moving ion strings in the ring. These laser beams provide the means of control and may be shaped with electro-optical modulators and/or acousto-optical modulators.

In many applications, the ion trap is used as an optical frequency reference. An atomic frequency reference based on an ion trap can be useful in miniature atomic instruments (e.g., atomic clocks and gyroscopes), precision laser sensing (e.g., remote nuclear blast detection), or as an ultra-stable oscillator for high-speed analog-to-digital converters and radar systems, for example.

Allan variance is the most common statistical function used to characterize and classify frequency fluctuations of a frequency reference. See Allan, Statistics of Atomic Frequency Standards, *PROCEEDINGS OF THE IEEE* Vol. 54, No. 2, 1966, which is incorporated by reference. The Allan deviation ("ADEV") is the square root of the Allan variance. ADEV is used to characterize the noise properties of a frequency standard or reference. While there are other ways to define fractional frequency instability including modified Allan deviation, in this disclosure, "fractional frequency instability" is the unitless Allan deviation, ADEV, defined above.

In general, frequency references are either extremely precise at the cost of massive SWaP, or they sacrifice performance to reduce SWaP. The frequency references with the lowest fractional frequency instability to date are optical atomic clocks. Optical atomic clocks hold the world record in ADEV on the order of $10^{-18}$. However, their extreme complexity and massive SWaP requirements disqualify optical atomic clocks for practical deployment. Furthermore, these optical clocks require their lasers to be locked to large (e.g., 20-100 cm long) or cryogenic optical cavities. This laser locking narrows the laser linewidth and provides an electromagnetic source (the laser) as a stable optical oscillator. However, these optical cavities are large, operate at their fundamental limits, and do not achieve long-term stability sufficient to enable standalone operation without an optical atomic clock. There have been a few demonstrations of atomic-based frequency references, but these have significant SWaP drawbacks as their size is set by the atomic velocity distribution and/or cryogenic operation. Similarly, any attempt to miniaturize lab-scale optical atomic clocks must solve the requirement of optical frequency references in order to operate.

Fundamentally, optical cavities are required for optical atomic references because the duty-cycle readout rate of traditional optical atomic clocks is long (>1 second) and thus some reference must be used for shorter timescales. The optical cavity is that reference. The readout rate depends on the ion loading time, cooling time, state-preparation time, Ramsey interrogation time, and readout time.

The disclosed ion trap breaks the conventional trade-offs by incorporating concepts from neutral atom beam clocks such as continuous readout. The ion trap is configured for (a) cooling continuously as the ions circulate, (b) state-preparation continuously as the ions circulate, (c) Ramsey interrogation continuously as the ions circulate, and (d) readout continuously while the ions circulate. There is still a duty cycle with the disclosed ion trap, but the duty cycle is primarily controlled by the ion-ion spacing, ion velocity, and signal noise (light collection). These parameters components can be controlled. The ion-ion spacing can be controlled according to the number of atoms loaded. The ion velocity can be controlled by detuning of optical molasses lasers or control voltages. The signal noise can be controlled using efficient optics collection which may utilize an integrated photonic platform.

The output of the ion trap may be treated as a "black box" ultra-stable laser. Ultra-stable lasers themselves have a variety of applications in timing, sensing, and spectroscopy. The set of applications of ultra-stable lasers forms a subset of applications of the disclosed ion trap.

One use of the ion trap for generating RF timing is as follows. Two or more ion traps can be used for RF clock generation by beating output lasers against each other. The beatnote will possess the relative stability of the two devices down-converted to a radio frequency. Another method for generating an RF clock can be realized by locking an optical frequency comb to an ion optical clock output laser which functions as an ultra-stable laser. In this scenario, the repetition rate of the frequency comb serves as the RF clock; the stability of the ultra-stable laser is transferred to the frequency comb repetition rate.

On a satellite, submarine, or other vehicle, a stable clock allows long-time (days, months, or years) secure communication even in a GPS-denied environment ("GPS"=Global Positioning System). This long-time secure communication contrasts with the existing state of art, which only provides minutes of secure communication.

For space-based radar, a stable clock enables the identification of slow-moving targets, the removal of "clutter" from radar return signals, the ability to have geosynchronous synthetic aperture radar (SAR) with millimeter resolution, and the enablement of longer integration times for SAR satellites.

In optical atomic clocks, an ultra-stable laser is a critical component to optical atomic clock miniaturization and acts to replace the cryogenic cavities used to generate stable lasers in state-of-art optical clocks.

In spectroscopy, an ultra-stable laser provides a tool to study vary narrow radioactive elements (nuclear transitions) by transferring the laser stability to another laser. As such, the ion trap may be useful for nuclear state-of-matter experiments that are of interest to the United States Departments of Defense and Energy. Also, in spectroscopy, an ultra-stable laser locked to an atomic reference can act as an absolute frequency calibration source relevant for future National Aeronautics and Space Administration (NASA) and astronomy experiments.

The present invention provides an atomic sensor that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration. An atomic sensor may be used for clocks, magnetometers, and gyroscopes, for example.

The present invention provides a mass spectrometer that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration.

In various embodiments, the disclosed ion trap functioning a mass spectrometer can be useful for:
 Trace gas analysis
 Identification of unknown chemical agents via molecular weight
 Isotope dating and tracing
 Atomic probes
 Protein characterization
 Particle trapping and analysis
 Biomedical research
 Biomedical diagnostics such as cancer identification The present invention provides a quantum computer that includes an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration. Preferably, the quantum computer is an error-corrected quantum computer.

In various embodiments, the disclosed ion trap functioning a quantum computer can be useful for:
 Quantum algorithms such as code breaking (e.g., cryptography)
 Entangled photon generation
 Quantum-entanglement computing
 Quantum simulations of complex chemical reactions or detailed catalytic mechanisms (e.g., enzyme reactions in living cells)
 Quantum simulations of many-body behavior at various length scales The ion trap (and device comprising the ion trap) of various embodiments will now be described in even more detail, it being understood that there are many ways to configure ion traps and devices using the principles set forth here, and that the invention shall only be limited to the claims.

Some variations provide a device that Ramsey-interrogates a collimated ion beam to directly lock an ultra-stable laser with fast feedback. The device components of these variations are as follows.

A vacuum chamber houses an atomic source and atomic sink, an ionizer, and a modified RF ion Paul filter in a ring configuration. The preferred vacuum pressure to reduce background collisions is $10^{-8}$ to $10^{-10}$ torr. A laser array and imaging system may be placed inside or outside the vacuum chamber, depending on whether these components are compact. The vacuum chamber may be a standard commercial off-the-shelf chamber (e.g., a stainless steel chamber) or may be a custom-built vacuum chamber fabricated from stainless steel, aluminum, borosilicate glass, aluminosilicate glass, sapphire, a combination thereof, or another material.

An atom source supplies a stream of neutral atoms to be ionized. The source is preferably positioned near the entrance of an ion collimator. The ion collimator may be a separate chamber with a conductance restriction with its aperture near the ionizer, a SAES dispenser (SAES Getters S.p.A., Milan, Italy), a pill dispenser, an alfasource dispenser, a liquid or solid phase of atoms (optionally mixed with other species), a light-induced atomic desorption (LIAD) source, a graphite (or other) intercalation compound of atoms, or an electrochemical solid-state source. In some embodiments, the atoms are Ca or Sr. Single-electron ionization of either Ca or Sr results in hydrogenic ions ($Ca^+$ or $Sr^+$) with a broad cycling dipole transition and a narrow quadrupole transition, both easily addressable by commercial lasers. $Ca^+$ and $Sr^+$ have a single valence electron and thus are isoelectronic with hydrogen.

The atomic species may be isotopically enriched relative to its natural isotopic abundance. For example, in the case of calcium (naturally occurring primarily as $^{40}Ca$), stable isotopes include $^{40}Ca$, $^{42}Ca$, $^{43}Ca$, $^{44}Ca$, $^{46}Ca$, and $^{48}Ca$. The calcium atoms to be ionized may be enriched in one or more of these isotopes, compared to the natural abundance. As one example, a selected mixture of $4°$ ca and $^{44}Ca$ may be used, which would ionize to form a mixture of $^{40}Ca^+$ and $^{44}Ca^+$.

In some embodiments utilizing positive ions, an ionizer excites a neutral atom, promoting one of the atom's two valence electrons to the continuum and leaving behind a hydrogenic ion. The ion trap may utilize optical or electric atom gas ionization.

In some embodiments using two-photon optical ionization, an external cavity diode laser (ECDL) is tuned to the neutral atom's electric dipole transition (S→P), exciting a valence electron from the ground S state to an excited P state. A second ECDL is used to promote the P-state electron to the continuum (P→continuum). Optical ionization allows isotope selection. The first ECDL may be frequency-tuned to selectively ionize one out of multiple naturally occurring isotopes in the atomic sample. Typical isotope shifts are large, on the order of GHz, easily addressable by a MHz-broad laser. Frequency tuning may be accomplished by a loose, easily engineered dichroic atomic vapor laser lock (DAVLL) locked to a vapor cell filled with the neutral atom. The second ECDL need not be frequency-stabilized at all. In these embodiments, the first ECDL (S→P laser) is a dedicated ionizing laser. The second ECDL (P→continuum laser) is simultaneously used as a Doppler laser regardless of the ionization method employed.

In some embodiments using electrical ionization, a small current-carrying filament may be placed near the neutral atom beam, leaving the atom source to excite a valence electron directly into the continuum. While these embodiments overcome the need for a dedicated ionizing laser, this method cannot readily be used for isotope selection. Thus, an isotopically enriched atom source would typically be required. Electrical ionization is the preferred ionization method, when prioritizing SWaP requirements.

A ring ion trap is used to collimate ionized atoms into a one-dimensional, velocity-controlled ion beam. The collimated ion beam travels along the length of the ion trap, through a sequence of spatially separated lasers for cooling, interrogation, and readout. The lasers can be sequenced for any of the applications described above.

In some embodiments, the ring ion trap is a modified RF ion mass filter/trap, with four parallel blades (e.g., see FIG. 1). The blades may be fabricated from tungsten, metallized ceramic, or metallized glass, for example. Two of the blades support ~15 MHz RF, for example, supplied by an amplified RF function generator. The other two blades are held at DC, tied to a DAC. This configuration provides longitudinal trapping (x, y), ensuring that the ion beam remains collimated in a one-dimensional crystal axially (z).

FIG. 1 illustrates an exemplary ion trap (side view). In FIG. 1, there is a trapped ion in a trapping region. There are two RF and two DC blades, which are each structurally continuous in the direction perpendicular to the page (FIG. 1 is a cross-sectional view of the blades). There are recessed control electrodes disposed on or within the structurally continuous blades. FIG. 1 depicts only a single recessed control electrode disposed within (built into) each blade, but this is only because FIG. 1 is a cross-section side view. In three dimensions, there are multiple recessed control electrodes, as spaced-apart electrode segments, disposed within (build into) each blade. Each pair of electrode segments allows for control of the electric potential in one dimension.

Referring to FIG. 1, in the cross-section view, the distance between blade tips may be from about 1 μm to 1 cm, such as from about 10 μm to about 1 mm, or from about 50 μm to about 500 μm. These values refer to the distance between one DC blade tip and one RF blade tip, pointing toward each other, horizontally arranged in FIG. 1, and pointing toward the trapped ion. These values also refer to the distance between one DC blade tip and one RF blade tip, vertically arranged in FIG. 1, above and below the trapped ion in the cross section of FIG. 1.

Figure 3:
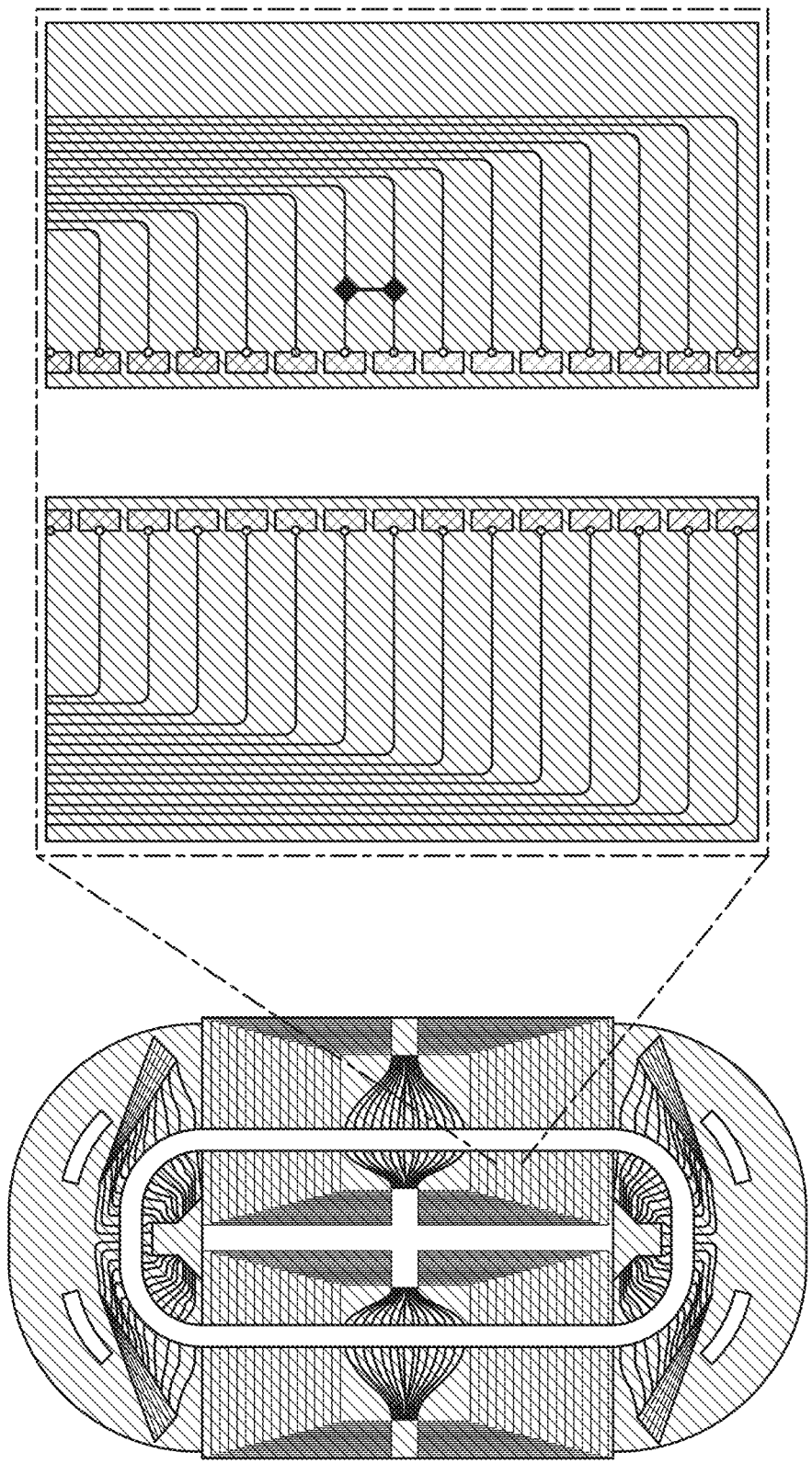
FIG. 3 illustrates an exemplary ion trap (top view), showing a plurality of spaced-apart electrode segments with equal spacing.

The distance between adjacent electrode segments may be selected from about 1 μm to about 1000 μm, such as from about 100 μm to about 500 μm, for example. This distance is depicted in FIG. 3 as a line terminated with diamond symbols at both ends. In various embodiments, the distance between adjacent electrode segments is about, at least about, or at most about 1, 2, 3, 4, 5, 10, 20, 30, 40, 50, 60, 70, 80, 90, 100, 150, 200, 250, 300, 350, 400, 450, 500, 600, 700, 800, 900, or 1000 microns, including any intervening range. Preferably, the electrode segments are equally spaced apart, as illustrated in FIG. 3.

The spaced-apart electrode segments may be fabricated as printed circuit boards (PCBs) using metalized PCB surfaces, such as regions of copper, nickel, silver, or platinum, for example. In some preferred embodiments, the PCB goes into the blades flush with the blades.

Figure 2:
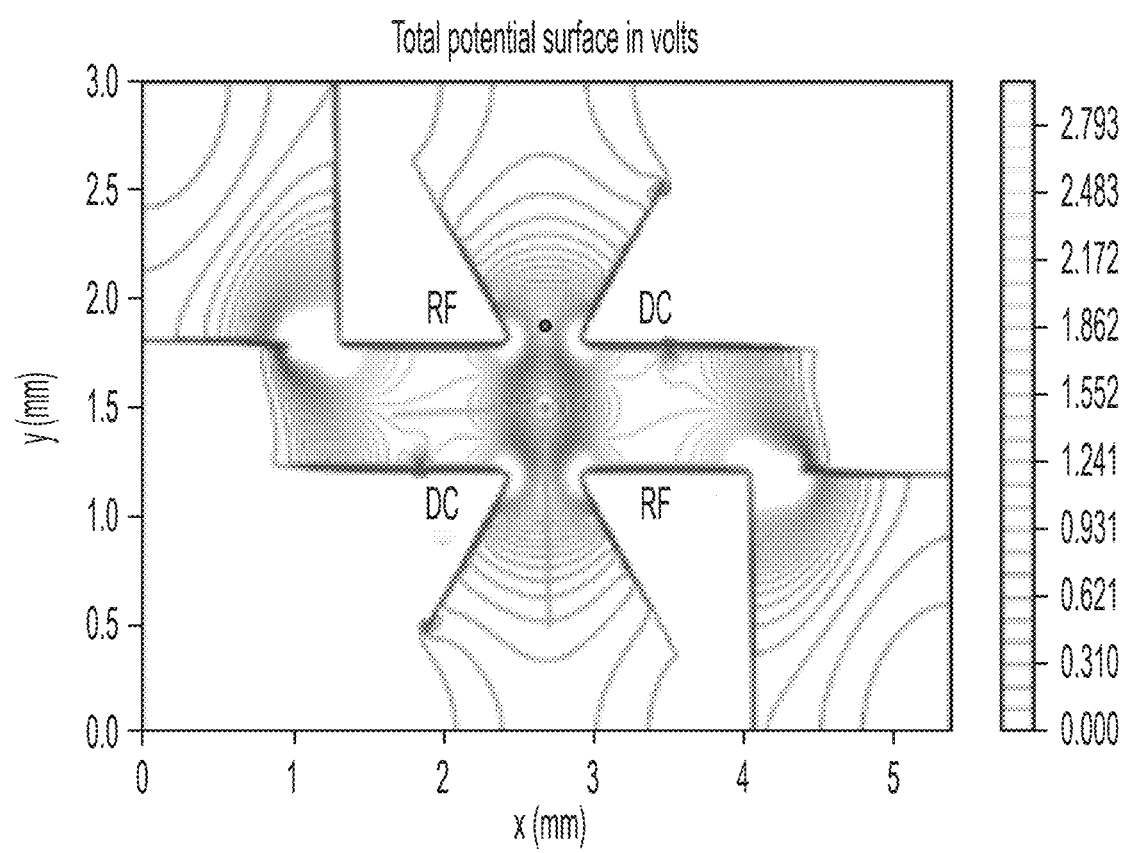
FIG. 2 depicts results of a SIMION simulation of the ion trap of FIG. 1, showing the quadrupole potential in the trap center and the effect of the recessed control electrodes.

SIMION® is a software package used to calculate electric fields and the trajectories of charged particles in those fields when given a configuration of electrodes with voltages and particle initial conditions. FIG. 2 depicts the results of a simulation of FIG. 1, using SIMION to show the quadrupole potential in the trap center and the effect of the recessed control electrodes provided for example via printed circuit boards.

The recessed control electrodes are controlled using DC voltages. The DC voltages may be supplied using conventional leads or connectors, adapted to an external power source, and in controllable electrical communication with the recessed control electrodes.

In preferred configurations, the RF blades and the DC blades are all structurally continuous, rather than being segmented. However, in other embodiments, the RF blades are structurally continuous while the DC blades are segmented with different DC voltages to provide transport control of the ion beam axially.

In some embodiments, an imaging system consists of a photomultiplier tube and a lens to focus ion fluorescence onto its aperture. Readout can either be taken as an average of ions as they pass by, or as single-shot readout (ion-by-ion) with an field-programmable gate array (FPGA) to gate photon arrivals with ions as they pass. Ultimately, ion velocity and ion spacing, along with the cycling transition's scattering rate, will set the readout time. The ions may have an ion velocity selected from about 1 micron/second to about 0.99c, where c is the speed of light in vacuum. In some embodiments, the beam velocity is selected from about 1 m/s to about 20 m/s.

The readout time can be estimated from the following equations. The time Tai for an ion to transit a straightaway length or distance is given by $T_{a1}=d_{RB}/V_{atoms}$, where dB is the interrogation/Ramsey time length and $V_{atoms}$ is the velocity of the ion beam. Subsequently, a second ion immediately following the first ion is read out at a time $T_{a2}=d_{RB}/V_{atoms}+d_{atom}/V_{atoms}$ where $d_{atom}$ is the atom-atom spacing. Thus, the measurement update time $T_m$ is set by $T_m=d_{atom}/V_{atoms}$ as the time between successive ion-ion measurements. An upper bound for the measurement time/bandwidth can be found by considering a 3 mm (dB)-long ion trap, a 10 μm ($d_{atom}$) ion-ion spacing, and a velocity of 1 m/s; this corresponds to $T_m=10$ μs and would be the fastest rate at which the atomic clock could be updated and read out. For Ca+ and Sr+, the cycling transition linewidth is about 20 MHz, so there is no advantage for these ions in using a faster ion-ion update rate $T_m$ beyond 20 MHz; the fastest a single ion can be read out is set by this rate.

Ions respond to applied electric fields (potentials) through electrostatic interactions. The applied electric fields are realized through electrode control segments. Many individual electrode control segments are disposed around the ring trap, providing both axial trapping as well as x-y compensation to null stray fields. In this way, the electric field at the center of the trap is made extremely uniform, and shuttling is made possible by the use of these electrode control segments. Furthermore, the recessing of these electrode control segments shields the center of the trap from DAC voltage noise. The electrode control segments can provide control in all three directions, since they lie on each RF blade, providing vectorial control.

Some embodiments employ printed circuit boards designed as multilayer PCBs with metallized surfaces facing the trap and dielectric traces facing away from the trap. This configuration helps prevent dielectric charging and consequent heating of the ions. Such a configuration may be accomplished using multilayer ceramic PCBs as well as via holes, for example. Some embodiments employ silicon, ceramics (such as alumina, aluminum nitride, or silicon nitride), glass, and other materials conventionally used in semiconductor processing.

Multi-ion and single-ion control is realized by the use of recessed electrode control segments on both the RF and DC blades. Referring to FIG. 1, the electrode control segments on the DC blades are preferably recessed with respect to the trap center, such that the leading edge of a recessed control electrode is father away from the trapped ion compared to the leading edge of the DC blade onto which the recessed control electrode is disposed. The "leading edge" refers to the edge of the electrode or blade that is closest to the trapped ion. As one example, the electrode control segments on the DC blades can be recessed approximately 850 microns with respect to the trap center, using 1-mm electrodes with a 250 µm gap between electrode segments. This configuration provides a potential at the trap center that is 150:1 with respect to the applied potential (voltage on the electrode control segment).

Again referring to FIG. 1, the electrode control segments on the RF blades are preferably recessed with respect to the trap center, such that the leading edge of a recessed control electrode is father away from the trapped ion compared to the leading edge of the RF blade onto which the recessed control electrode is disposed. Using the above example with 1-mm electrodes with a 250 µm gap between electrode segments, the electrode control segments on the RF blades can be recessed approximately 1.35 millimeters with respect to the trap center. This configuration provides a potential at the trap center that is 6000:1 with respect to the applied potential.

Recessing the electrode control segments provides a spatial filter of DAC voltage noise. For example, assuming a 16 bit DAC with 1 volt of peak-peak voltage then the smallest voltage that can be applied to the segment is 15 uV. Assuming a voltage noise on the order of 15 µV from the DAC, the expected noise is about 15 µV/150=0.1 µV at the trap center (position of the trapped ion). If the ions are cooled to the Doppler limit on the order of 1 milliKelvin (mK), then their thermal energy is 0.08 µeV (milli-electron volt). Therefore the noise is on the order of the ion thermal energy. In contrast, for the electrode control segments disposed on the RF blades, assuming a peak-peak voltage of 10 V and a 16 bit DAC, then the anticipated voltage noise fluctuations are approximately 150 µV. However, at the trap center, these fluctuations become very low, approximately 25 nV fluctuations. For these distances, the projections of the electrode control segments onto the ion trap axis realize approximately Gaussian potentials at the trap center, with FWHM values of about 1.44 mm for the DC blades and about 2.0 mm for the RF blades, as shown in FIG. 4. The FWHM values are substantially larger than the electrode segment lengths themselves, providing a reasonably smooth potential for the ions as simulated in SIMION (FIG. 4).

FIG. 4 depicts a SIMION software simulation. In the upper-left panel of FIG. 4, the layout of electrode control segments disposed on RF and DC blades is shown. The upper-right panel, the layout for the SIMION simulation is shown. The lower-left panel shows the projection of electrode control segments on the RF blade, onto the trap z axis. The lower-right panel shows the projection of electrode control segments on the DC blade, onto the trap z axis Turning on or off the electrical fields generated by the electrodes within the ion trap creates programmable ion potentials for shuttling the ions and/or for cancelling stray fields at the trap center. By having the electrode segments in both the x-y and z directions, stray fields may be cancelled in all directions. In some embodiments, two end-voltages act as barriers confining the ion axially, while the middle segment acts as the confining harmonic well region.

The secular frequencies of the ion trap depend on the particular geometry of the trap, such as the blade-blade distance, as well as the RF voltage amplitude and the drive frequency. The axial secular frequency using DC electrode control segments may be approximately 100 kHz. The radial secular frequency may be approximately 0.1-2 MHz, assuming ~200 V of RF, 0.5 mm horizontal trap blade spacing, 0.6 mm vertical trap blade spacing, and 10-40 MHz drive frequencies. These values are exemplary only, applicable to some but not all embodiments.

The ion-trap length and size may be chosen to optimize the Ramsey interrogation region and readout speed. For the case of quantum-projection-noise-limited optical-frequency references and clocks, the fractional Allan deviation (stability) for a single-ion frequency reference is given by $$\sigma_y(\tau) = \frac{\delta f}{f} \sqrt{\frac{T_m}{\tau}}$$

where f is the optical frequency, $\delta f$ is the Fourier linewidth or atomic transition linewidth depending on experimental conditions, $T_m$ is the time between measurements, and $\tau$ is the total measurement time. The Allan deviation can be simplified to $$\sigma_y(\tau) = \frac{\delta f}{f} \sqrt{\frac{1}{n}}$$

where n is the number of measurements. For the purpose of a clock employing Sr*, the strontium ion exhibits a ~1 Hz natural linewidth, but in practice this is unrealizable without significant magnetic field shielding due to Zeeman-induced dephasing. Realizable linewidths of ~1 kHz, for example, may be used for designing the length of the ion track.

The total ion-trap length may be selected from about 1 mm to about 1 m, such as from about 1 cm to about 100 cm, or from about 2 cm to about 20 cm. The total ion-trap length is the distance around the entire ring (e.g., see FIG. 7, which is a top view of an exemplary ion trap). In various embodiments, the total ion-trap length is about, at least about, or at most about 1, 2, 5, 10, 25, 50, 75, 100, 150, 200, 250, 300, 400, 500, 600, 700, 800, 900, or 1000 millimeters, including any intervening ranges.

Ramsey spectroscopy provides an interferometric laser interrogation of an atomic resonance. Ramsey spectroscopy is often performed in the time domain where time-dependent microwave or laser fields are used, but in the disclosed technology, Ramsey spectroscopy may be performed in the spatial domain via an atomic beam where the time between Ramsey pulses is set by the velocity of the atoms in the atomic beam and the spatial distance between Ramsey laser beams. FIG. 5 depicts a time-domain illustration of a pulse sequence (top), and a spatial domain illustration of a pulse sequence (bottom). The time for the pulse sequence is convolved with the spatially separated laser-beam distance and the velocity of the ions which sets the transit time.

Figure 6A:
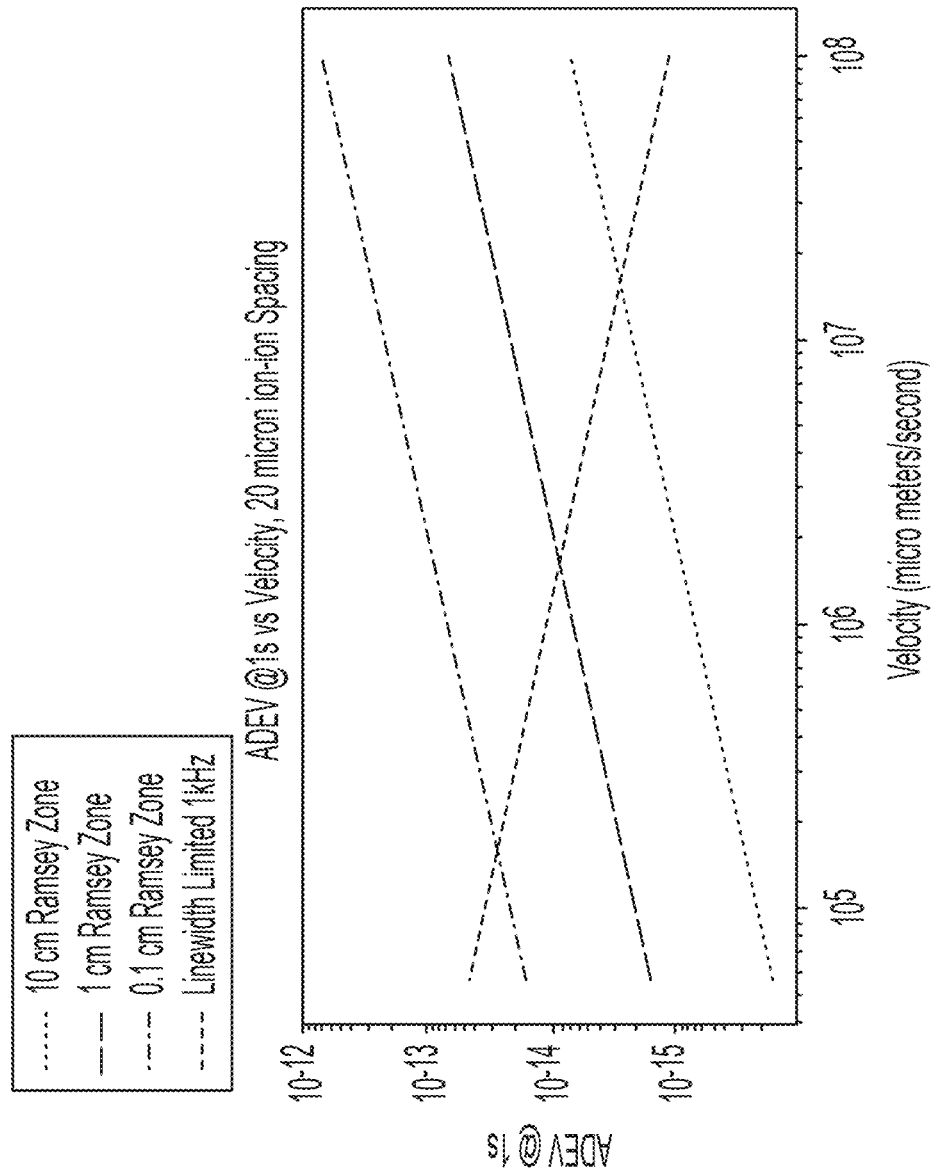
FIG. 6A shows calculated ADEV versus ion velocity at 1 second, according to calculations in some embodiments.
Figure 6B:
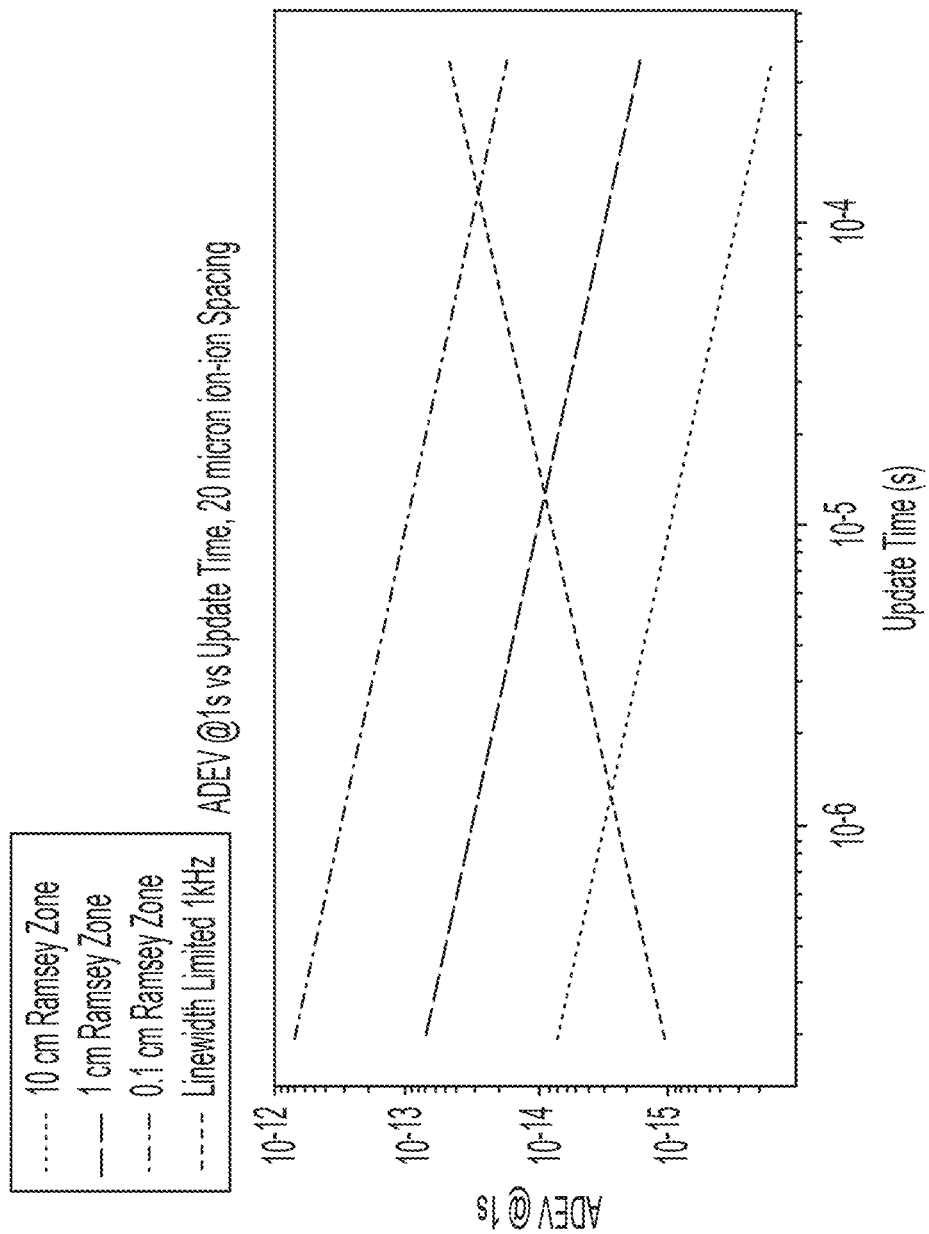
FIG. 6B shows calculated ADEV versus update time at 1 second, according to calculations in some embodiments.

To illustrate some embodiments with calculations, spatially-separated-beam two-beam Ramsey spectroscopy can be considered. The time between measurements $T_m$ is given by $T_m = d_{atom}/V_{atoms}$ where $d_{atom}$ is the ion-ion spacing and $V_{atoms}$ is the velocity of the atoms assuming ion-ion readout. Averaging over multiple ions will result in a slower readout time but an improved signal-to-noise ratio. Thus, the fractional Allan deviation (ADEV) will be better when averaging, at the expense of a slower-readout clock. The Ramsey time is $T_R = d_{RZ}/V_{atoms}$ where $d_{RZ}$ is the length of the Ramsey zone. The time between pulses is set by the length of this zone and by the velocity of the atoms (see FIG. 5). This corresponds to a Fourier-limited linewidth set by $\delta f = 1/T_R$. The velocity can be controlled via laser cooling and/or ion shuttling. For these calculations, the velocity is assumed to be set by laser cooling and to be Doppler-limited. The Doppler temperature from laser cooling is set by $h\Gamma = k_B T$ where $k_B$ is the Boltzmann constant, T is the temperature in Kelvin, $\Gamma$ is the atomic linewidth in Hz, and h is the reduced Planck constant, $h/2\pi$. For strontium ($Sr^+$), $\Gamma/2\pi$ is about 20 MHz, corresponding to a ~1 mK temperature. The expected ADEV may be calculated at 1 second for different trap geometries and update times ($T_m$), assuming a 20 micron ion-ion spacing. See FIG. 6A and FIG. 6B for ADEV versus ion velocity and update time, respectively, at 1 second. From these calculations, an ADEV of $\sim 10^{-15}$ at 1 second requires a ~1 cm Ramsey dark zone with a 1 kHz limited linewidth.

Laser-based control of the ion velocity can be realized by shining two counterpropagating lasers in a region of the trap not used for Ramsey spectroscopy. These lasers are nominally detuned with respect to a strong cooling transition such as the S→P transition in $Sr^+$ (when strontium is employed in the ion trap). It can be assumed that the lasers are operating in a low-intensity limit with respect to the saturation parameter s, given by $$s = \frac{\Omega^2}{2(\delta^2 + \Gamma^2/4)}$$

where $\Gamma$ is the atomic transition linewidth of ~20 MHz, $\Omega$ is the Rabi frequency set by the laser intensity and spot size, and $\delta$ is the laser-atom detuning. Then the time-averaged force acting on the atoms from a single laser will be given by:

$$F = \frac{\Gamma}{2} \frac{s}{1+s} \hbar k$$

where hk is the laser photon momentum. Then the force from both lasers is the sum of these two counterpropagating forces. By keeping both lasers red-detuned with respect to the atomic transition and detuned with respect to each other, a net acceleration can be applied for the duration the ion spends in the laser beams. Simultaneously, the lasers act to cool the ions since the red-detuning enforces energy conservation in which phonons from the trap together with the red-detuned photon provide sufficient energy in order for a light-matter interaction to occur. The detuning of the two counterpropagating lasers can be controlled, for example, using two acousto-optical frequency shifters and a single laser.

In some variations, a method of continuous ion trapping comprises:

(a) creating an atomic vapor;

(b) ionizing at least some atoms in the atomic vapor, to form ionized atoms;

(c) trapping the ionized atoms in an ion trap, to form trapped ions, wherein the ion trap preferably comprises a plurality of structurally continuous blades and a plurality of recessed control electrodes that are capable of controlling and storing ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration;

(d) optionally, illuminating some of the ionized atoms with a cooling laser;

(e) illuminating at least some of the ionized atoms with a first probe laser at a first-probe-laser frequency;

(f) illuminating at least some of the ionized atoms with a second probe laser at a second-probe-laser frequency;

(g) adjusting the first-probe-laser frequency and the second-probe-laser frequency using Ramsey spectroscopy to an S→D transition of at least some of the ionized atoms;

(h) illuminating at least some of the ionized atoms with a readout laser to determine a ground-state population of the ionized atoms;

(i) optionally, illuminating at least some of the ionized atoms with a third probe laser; and (j) optionally, illuminating at least some of the ionized atoms with a fourth probe laser after step (i), if conducted.

Figure 8:
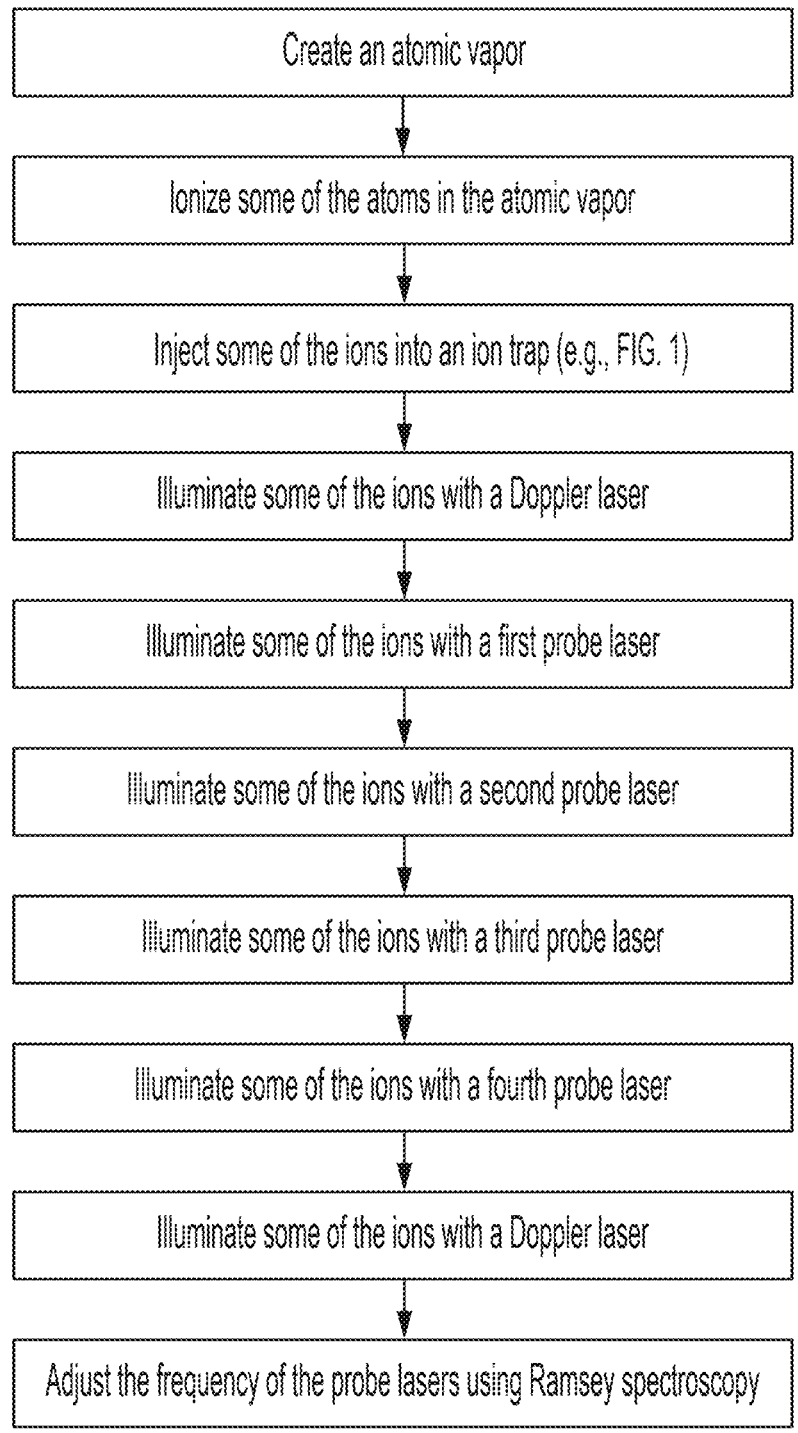
FIG. 8 is a flowchart of an exemplary method flowchart, according to some embodiments.

FIG. 8 is a flowchart of an exemplary method flowchart, according to some embodiments.

In some variations, the present invention provides an ion-based frequency reference that provides an optical frequency standard with extremely high levels of stability and with fast, continuous readout, in a compact package. Some embodiments are inspired by a Ramsey-Bordé interferometer. A Ramsey-Bordé interferometer involves a linear stream of atoms probed by a well-defined sequence of oscillatory fields. In the present invention, instead of using hot neutral atoms, a stream of cooled, guided or trapped ions is employed. The ions are guided or trapped using the ion trap disclosed herein. By employing a cooled, controlled stream of ions, a combination of features not available with any other frequency reference may be realized: (i) very low fractional frequency instability, (ii) fast, continuous readout, (iii) compact size due to reduced atom velocity, and/or (iv) reduced vacuum requirements due to deep trap depth. A significant difference with respect to a Ramsey-Bordé interferometer is that the degree of center of mass-optical transition coupling is set by the Dicke parameter which is a function of trap geometry and voltage. To be completely analogous to a Ramsey-Bordé system the Dicke parameter would have to be zero.

As described herein, atomic spectroscopy on a stream of cooled and potentially trapped atoms is performed with a high signal-to-noise ratio by utilizing a specially designed ion trap. The ion trap is configured to optimize the fractional frequency instability and the size, weight, and power of the device. The trap/filter controls the ion propagation velocity, thus significantly reducing dimensional requirements, Doppler error, and transit time error. The trap/filter also provides a deep trapping potential to relax vacuum requirements.

The stability and ultimate size of conventional atomic beam devices are limited by Doppler contributions to the error (first and second order), the transit-time broadening of the atomic species in relation to the laser beams, and the velocity of the atoms. Historically, atom interferometers and clocks use a beam of neutral atoms transiting an array of lasers. The neutral atom beam, used in the historical implementation, is replaced—according to this invention—with an ion beam. The applied electric field within the ion trap allows for precise velocity control, as well as controlled density and spacing of the ions. The ion trap may decrease Doppler broadening and transit-time broadening suffered by the conventional neutral-atom approach. Controlled ion-beam velocity also may enable long atomic transit times to be achieved without sacrificing size and power requirements.

To date, atom-based frequency references (both RF and optical) employ trapped atoms whose transitions are probed via low-duty rate (on the order of Hz), long-integration time spectroscopy. Reference to the atoms can necessarily be made only once per pulse sequence, resulting in atom feedback that is very slow, on the order of seconds. By contrast, the present invention may utilize a continuously moving ion beam and a continuous-wave laser array with continuous interrogation. Reference to the ions is continuously made as the ion beam passes through the cascade of laser beams, allowing direct fast-locking to the atomic transition. The use of an optical transition results in a higher resonance quality factor than RF transitions. The continuous method results in continuous fast readout of optical transitions, which is a significant benefit for next-generation timing solutions.

The frequency reference disclosed herein is enabled by the generation of an ultranarrow-linewidth laser. The frequency reference can be used to lock a laser source for precision sensing/timing applications. The frequency reference can be used as an ultra-stable optical frequency reference to which an external laser can be locked, via a standard beat-note lock, for use by other optical, quantum, metrology, or communication instruments.

The present invention, in some variations, provides a fieldable (e.g., on the order of 10 cm long) interferometric frequency-reference apparatus with a stability competitive with conventional atomic clocks, operable at shorter averaging times, and with drift resistance greater than state-of-the-art cryogenic optical cavities.

While the disclosed device may fill the niche of traditional stable oscillators, the device has other applications enabled by the realization of an ultra-stable laser. One application is for precision sensing. An example of precision sensing is forensic seismology using undersea fiber-optic cables, where traditional seismometers are unavailable or impractical. Many other practical applications have been described earlier in the specification.

The present invention, in various embodiments, provides multiple benefits over prior and state-of-art optical frequency references. The frequency reference is fundamentally limited only by atomic properties and therefore is capable of long-term averaging, unlike cavities as passive optical resonators. The limit of fractional frequency stability is therefore the fundamental stability limit of about 1018 (ADEV), dictated by quantum physics.

The frequency reference disclosed herein does not require cryogenic operation or any cryogenic components. Unlike conventional optical clocks, the frequency reference has fast readout without the need for systematic calibration.

With cooled ions, the propagation length of the ion beam can be proportionally reduced as the beam size is set by the velocity of the ions relative to the intrinsic atomic quadrupole linewidth. By using trapped ions instead of neutral atoms, a higher degree of control may be realized for the atomic velocity distribution.

Most fieldable frequency references are high-quality-factor radio-frequency cavities—e.g., oven-controlled crystal oscillators (OCXOs)—which are interfaced with standard electronics. While appealing in terms of size/weight/power requirements, such frequency references are based on a material like quartz that experiences long-term drifts and cannot be used in situations where long-term stability is required (ADEV$\approx 10^{-10}$-$10^{-13}$).

For applications requiring timing and long-term stability superior to OCXOs while maintaining deployability (e.g., Global Positioning System applications), warm radio-frequency atomic clocks are used. However, these clocks are still complex, requiring their own separate precision oscillator. Subsequently, chip-scale atomic clocks are almost always paired with their own highly stable frequency reference. Yet, their performance is still on the order of ADEV$\approx 10^{-13}$ on short time scales, and only improving on long time-scales such as greater than 100 seconds.

In some embodiments, a significant difference between the disclosed ion trap when used as a frequency reference, compared to state-of-art Ramsey-Bordé interferometers or atomic clocks, is that the hot neutral atoms in an interferometer, or cold trapped atoms in a clock, are replaced with a continuously moving ion beam.

Another significant difference with conventional art is that, in preferred embodiments, the disclosed frequency reference replaces pulsed lasers (in a clock) with a sequence of spatially separated continuous-wave lasers. By implementing a beam clock in a trapped-ion system, a continuous beam of ions is used for fast readout while avoiding the velocity distribution problems of neutral atoms.

Another difference with conventional art is that the disclosed frequency reference, in preferred embodiments, greatly relaxes the requirements for complex cooling procedures. Preferred frequency references employ minimal laser cooling and then trapping/guiding ions in a deep radio-frequency (RF) potential field. Deeper traps can be made with the disclosed ion trap than with typical magnetic-field traps needed for neutral atoms. Further, the disclosed ion trap allows for control of propagation velocity. Preferred methods exclusively utilize radio-frequency and direct-current fields, thereby requiring fewer lasers. The disclosed ion trap is compatible with solid-state paths to integration, and is more amenable to miniaturization.

In some variations, an interferometric frequency-reference apparatus comprises:
a vacuum chamber;
an atom source configured to supply neutral atoms to be ionized;

an ionizer configured to excite the neutral atoms to form ionized atoms (such as, but not limited to, $Ca^+$ or $Sr^+$);

an ion trap comprising a plurality of structurally continuous blades and a plurality of recessed control electrodes that are capable of controlling ions, wherein the plurality of structurally continuous blades includes at least two structurally continuous RF blades and at least two structurally continuous DC blades, wherein recessed control electrodes are disposed on or within the structurally continuous blades, and wherein the ion trap is in a ring configuration;

one or more probe lasers; and a readout laser configured to determine a ground-state population of the ionized atoms, wherein the atom source, the ionizer, and the ion trap are disposed within the vacuum chamber.

In some embodiments, the atom source is a solid-state electrochemical atom source. Integration with a solid-state electrochemical atomic beam source can reduce size, weight, and power as the device is smaller, is more power-efficient, and provides a controlled ion beam when compared to conventional atomic ovens.

In some embodiments, the ionizer is disposed inside the ion trap. In these embodiments, the ionized atoms are formed within the ion trap. In other embodiments, the ionizer is disposed outside the ion trap. In these embodiments, the ionized atoms are formed and then injected into the ion trap.

In some embodiments, one or more probe lasers are configured for Ramsey spectroscopy on the ions. In preferred embodiments, all probe lasers present are configured for Ramsey spectroscopy on the ions. The number of probe lasers may vary but is preferably two or more, such as four probe lasers.

In some embodiments, the one or more probe lasers are configured to probe quadrupole or both dipole and quadrupole transitions of the ions. Configuring includes selecting proper wavelength and ensuring sufficiently narrow linewidth.

In some embodiments, a readout laser is a Doppler laser configured to perform a quantum-jump measurement to determine the ground state population, post-Ramsey interrogation, via fluorescence from a S→P cycling transition.

In some embodiments, the device further comprises a cooling laser. The cooling laser is configured to cool the ions in preparation for Ramsey spectroscopy. In certain embodiments, the readout laser is itself configured for cooling, and there is not necessarily a physically distinct cooling laser.

The device may further comprise an injection electrode. The injection electrode is different from the ionizer. An injection electrode may create an electric potential field that directs ions into the ion collimator, in embodiments wherein atoms are ionized outside the ion trap. In preferred embodiments, atoms are ionized within the ion trap, and an injection electrode is not necessary.

The device may further comprise an ion sink configured to collect the ions exiting the ion trap. The ion sink, if present, is preferably disposed within a vacuum chamber.

The device preferably further comprises an imaging system configured to focus fluorescence from the ions. The imaging system may include an optical lens or system of lenses, a camera, a photomultiplier tube, and/or a photon bucket detector.

In certain embodiments, an ion trap is provided without a vacuum chamber. At a later time, the ion trap is situated within a vacuum chamber. The vacuum chamber typically houses the atom source, the ion sink, the ionizer, and the ion trap. The vacuum level may be moderate, such as a chamber pressure in the range of about $10^{-5}$ torr to about $10^{-8}$ torr. The laser array and the imaging system may be placed inside or outside the vacuum chamber, depending on whether these components are compact. The vacuum chamber may be a standard off-the-shelf (e.g. stainless steel) chamber or may be a custom-built vacuum chamber from stainless steel, aluminum, borosilicate glass, aluminosilicate glass, sapphire, or a combination thereof, for example.

In certain systems and methods, the atomic vapor and/or the ionized atoms are obtained from a solid-state electrochemical atom source. Solid-state electrochemical atom sources will now be further described.

Some variations utilize an atomic-beam source device as a solid-state electrochemical atom source, wherein the atomic-beam source device comprises:

a first electrode;

a second electrode that is electrically isolated from the first electrode; and a first ion conductor interposed between the first electrode and the second electrode, wherein the first ion conductor is capable of transporting metal ions, and wherein the first ion conductor is in contact with the first electrode and with the second electrode.

The atoms that are emitted (as atomic vapor) from the atomic-beam source device may be alkali metal atoms, alkaline earth metal atoms, rare earth metal atoms, mercury, or a combination thereof. For example, the metal atoms may be selected from the group consisting of Rb, Cs, Ca, Na, K, Sr, Li, Yb, Hg, and combinations thereof. Other metal atoms may be emitted from the atomic-beam source device, including Si, Ga, Al, In, As, Sb, Ge, Sn, Pb, Mg, Ba, Te, Au, Pt, Cr, and Cd, for example.

A voltage may be applied for a given duration across two electrodes that are situated on opposite sides of the first ion conductor, to source atoms. The voltage polarity may be switched so that the atomic-beam source device becomes an atom sink. The voltage amplitude is selected to control the atom flux.

In various embodiments, the applied voltage between two electrodes is from about 0.01 V to about 100 V, such as from about 0.1 V to about 10 V. The device power input for sourcing metal atoms is preferably less than about 500 mW, more preferably less than about 200 mW, and most preferably less than about 100 mW.

An "electrode" is a region that is electrically conductive or includes one or more material phases that are themselves electrically conductive. The first electrode permits the conduction of electrons and is in contact with the first ion conductor (discussed below). The first electrode permits (a) conduction of the same ionic species as conducted by the first ion conductor, (b) diffusion of a reduced form of the same ionic species as conducted by the first ion conductor, or both (a) and (b).

In some embodiments, the first electrode is a porous electrically conductive structure. In some embodiments, the first electrode is a selectively permeable electrically conductive layer. For example, see U.S. Pat. No. 10,545,461 to Roper et al, which is incorporated by reference herein. In this patent application, "selectively permeable" refers to the transport of metal atoms through the electrode, by diffusion or conduction. In some embodiments, the first electrode is a mixed ion-electron conductor. For example, see U.S. Pat. No. 10,828,618 to Roper et al, which is incorporated by reference herein.

The first electrode is preferably a porous electrically conductive layer. The porous electrically conductive layer is preferably a patterned metal layer directly on one surface of the first ion conductor. The metal layer is preferably thin, such as less than 1 micron in thickness, more preferably less than 200 nanometers or less than 100 nanometers in thickness. The pattern of the metal layer is preferably such that metal regions are closely spaced, such as less than 100-micron line pitch, more preferably less than 10-micron line pitch, and most preferably less than 2-micron line pitch. The metal layer may be patterned with photolithography, electron-beam lithography, direct-write lithography, direct-write metal deposition (e.g., ion beam-induced deposition), interference lithography, etc.

Exemplary electrode materials for the porous electrically conductive layer include Pt, Mo, W, Ni, Cu, Fe, Al, and combinations thereof. The porous electrically conductive layer may also entail more than one layer, such as a Ti adhesion layer and a Pt layer.

The porous electrically conductive layer preferably does not chemically interact with the ionic species conducted by the first ion conductor. For example, the porous electrically conductive layer preferably does not form an intermetallic phase and does not chemically react with the ionic species other than enabling electrochemical oxidation and reduction. Additionally, the porous electrically conductive layer preferably does not chemically interact with the first ion conductor itself, other than possible chemical bonding to adhere to the surface of the first ion conductor. For example, portions of the porous electrically conductive layer preferably do not form mobile ions that are transported to the first ion conductor.

In some embodiments, the first electrode has a high diffusivity for the metal atoms that are sourced. The metal atoms which comprise the atomic vapor have a diffusivity in the first electrode that is preferably at least about $10^{-10}$ cm$^2$/s and more preferably at least about $10^{-6}$ cm$^2$/s, measured at 25° C. or at an operation temperature.

The first electrode is at least a fair electrical conductor. The electrical resistivity of the first electrode is preferably less than 10 kΩ·cm, more preferably less than 1 kΩ·cm, and most preferably less than 1 Ω·cm, measured at 25° C.

In some embodiments, the first electrode comprises an intercalation compound, which is a material capable of being intercalated with atoms of the atomic vapor. In some embodiments, the intercalation compound is graphite, MoS$_2$, TaS$_2$, or a combination thereof, for example. The intercalation compound may be disposed in a uniform layer that consists essentially of the intercalation compound and any intercalated atoms. The thickness of the intercalation compound layer is preferably less than 100 microns and more preferably less than 10 microns.

In some embodiments, the first electrode comprises particles of an intercalation compound in a matrix. The matrix is preferably a polymer binder, such as (but not limited to) poly(vinylpyrrolidone) poly(methacrylate), poly(methyl methacrylate), poly(ethyl methacrylate), poly(2-hydroxyethyl methacrylate), fluoroelastomers, cellulose resin, or a combination thereof. The polymer binder preferably has low outgassing at device operating temperature and is compatible with ultra-high vacuum. Matrix additives may be included to increase the electrical conductivity of the first electrode. For example, small conductive carbon particles may be included (e.g. Super-P® carbon black).

The first electrode may also include a region and/or layer with high electrical conductivity to minimize sheet resistance of the first electrode. For example, the first electrode may consist of two layers: a layer that is substantially graphite and a layer that is a porous electrically conductive layer, such as a thin platinum mesh. This layered configuration may be beneficial to ensure that the electrical potential, when applied, does not vary considerably (e.g., <0.1 V) across the electrode surface even if an intercalation material has mediocre electrical conductivity or if an intercalation material is very thin. The highly electrically conductive layer may include Pt, Mo, W, or a combination thereof. The highly electrically conductive layer may also entail more than one sub-layer, such as a Ti adhesion sub-layer and a Pt sub-layer. The highly electrically conductive layer preferably does not form an intermetallic phase with, or otherwise chemically react with, the ionic species. The highly electrically conductive layer preferably does not chemically interact with the first ion conductor.

In some embodiments, the first electrode is a mixed ion-electron conductor, which means that the first electrode is both an ion conductor and an electron conductor. The mixed ion-electron conductor preferably has an electrical sheet resistance less than 10 MΩ/□ (10 million ohms per square), more preferably less than 100 kΩ/□, and most preferably less than 1 kΩ/□. The electrical resistivity of the mixed ion-electron conductor is preferably less than 100 kΩ·cm, more preferably less than 10 kΩ·cm, and most preferably less than 100 Ω·cm. The ionic conductivity of the mixed ion-electron conductor is preferably at least $10^{-12}$ Ω$^{-1}$·cm$^{-1}$, more preferably at least $10^{-9}$ Ω$^{-1}$·cm$^{-1}$, and most preferably at least $10^{-6}$ Ω$^{-1}$·cm$^{-1}$. The ionic conductance of the mixed ion-electron conductor, through the thickness of the electrode, is preferably less than 10 kΩ, more preferably less than 1 kΩ, and most preferably less than 100Ω.

Exemplary doped mixed ion-electron conductors include, but are not limited to, $Rb_{1-2x}M_xAlO_2$ (x is from 0 to less than 0.5) wherein M=Pb, Cd, and/or Ca; $Rb_{2-2x}Fe_{2-x}M_xO_4$ (x is from 0 to 1) wherein M=P, V, Nb and/or Ta; $Rb_{2-2x}Ga_{2-x}M_xO_4$ (x is from 0 to 1) wherein M=P, V, Nb and/or Ta; $Rb_{2-2x}Al_{2-x}M_xO_4$ wherein M=P, V, Nb and/or Ta; and $Rb_{1-x}Al_{1-x}M_xO_2$ (x is from 0 to less than 1) wherein M=Si, Ti, and/or Ge.

In some embodiments, the mixed ion-electron conductor material may be selected from alkali pyrophosphates, such as $Rb_4P_2O_7$. The alkali pyrophosphate is optionally doped with one or more atoms selected from Ca, Sr, Ba, Pb, Y, La, and/or Nd, for example. Exemplary compounds for the doped alkali pyrophosphates include, but are not limited to, $Rb_{4-2x}V_xP_2O_7$ (x is from 0 to less than 2) wherein M=Ca, Sr, Ba, and/or Pb; and $Rb_{3-3x}M_xPO_4$ (x is from 0 to less than 1) wherein M=Y, La, and/or Nd.

In some embodiments, the mixed ion-electron conductor is a uniform layer that consists essentially of the mixed ion-electron conductor. The thickness of the mixed ion-electron conductor material is preferably about 500 microns or less, and more preferably about 100 microns or less.

In some embodiments employing a mixed ion-electron conductor, the first electrode comprises a region or layer with high electrical conductivity to minimize the electrical sheet resistance of the first electrode. For example, the first electrode may include two layers: a layer that is a mixed ion-electron conductor and a layer that is a highly electrically conductive layer (e.g., a thin Pt mesh). The layered configuration allows for the electrical potential, when applied, to not vary considerably (e.g., <0.1 V) across the electrode surface even if the mixed ion-electron conductor has mediocre electrical conductivity or if the mixed ion-electron conductor is very thin. The highly electrically conductive layer may include Pt, Mo, W, or a combination thereof. The highly electrically conductive layer may itself include sub-layers, such as a Ti adhesion sub-layer and a Pt sub-layer. The highly electrically conductive layer preferably does not chemically interact with the ionic species and preferably does not form an intermetallic phase with the ionic species. Also, the highly electrically conductive layer preferably does not chemically interact with the first ion conductor. For example, when the highly electrically conductive layer contains Pt, preferably $Pt^{2+}$ or other platinum ions do not become mobile ions within the first ion conductor.

The second electrode is preferably in contact with the first ion conductor. The second electrode is not in electrical contact with the first electrode. The second electrode contains at least a second-electrode first phase that stores and transports neutral atoms. Transport of neutral atoms is preferably via diffusion, and storage of neutral atoms is preferably via intercalation.

The atomic species contained within the second-electrode first phase are preferably a reduced form of the same ionic species as in the first ion conductor. Alternatively, or additionally, a different atomic species may be contained within the reservoir. For example, when the device is sourcing atoms, Na may be contained within the second electrode/reservoir and may be oxidized, while Rb may be reduced at the first electrode.

The second-electrode first phase is preferably graphite. The second-electrode first phase may include predominately $sp^2$-bonded carbon. Examples of $sp^2$-bonded carbon include, but are not limited to, graphite, monolayer graphene, few-layer graphene, graphene flakes, holey graphene (perforated graphene), carbon nanotubes, fullerenes (e.g., $C_{60}$, $C_{70}$, etc.), polyaromatic hydrocarbons (e.g., pentacene, rubrene, hexabenzocoronene, coronene, etc.), chemical-vapor-deposited graphitic carbon, pyrolyzed carbon-containing molecules or polymers include pyrolyzed parylenes (e.g., pyrolyzed poly(para-xylylene) or analogues thereof), or combinations of the foregoing.

The second-electrode first phase may alternatively, or additionally, include a metal dichalcogenide. In various embodiments, the second-electrode first phase includes a transition metal oxide (e.g., ZnO), a transition metal sulfide (e.g., $MoS_2$ or $TaS_2$), a transition metal selenide (e.g., $TiSe_2$), or a transition metal telluride (e.g., $TiTe_2$).

The second-electrode first phase is preferably in the form of particles. It is preferable that the particles have at least one dimension that is relatively short to reduce the diffusion length for neutral atoms, thereby improving the transport rate. The particles of the second-electrode first phase may have a minimum dimension (e.g., diameter of spheres or rods) of less than 1000 microns, less than 500 microns, less than 100 microns, less than 50 microns, less than 10 microns, less than 5 microns, less than 1 micron, or less than 500 nanometers, for example. In preferred embodiments, the particles of the second-electrode first phase have a minimum dimension selected from about 100 nanometers to about 20 microns. Particle sizes may be measured by a variety of techniques, including dynamic light scattering, laser diffraction, image analysis, or sieve separation, for example.

The second-electrode first phase is preferably a continuous phase or a semi-continuous phase. For example, the second-electrode first phase may be or include a carbon aerogel, a carbonized polymer, or reticulated vitreous carbon foam.

The second electrode is preferably electrically conductive. In various embodiments, the electrical resistivity of the second electrode is preferably less than 10 k$\Omega$·cm, more preferably less than 1 k$\Omega$·cm, even more preferably less than 100 $\Omega$·cm, and most preferably less than 10 $\Omega$·cm, measured at 25° C.

The thickness of the second electrode may be selected from about 1 micron (or less) to about 100 microns (or more). Typically, the second electrode is thicker than the first electrode or the third electrode.

In addition to the first phase, the second electrode may contain one or more other phases to form a composite electrode/reservoir. For example, see U.S. Pat. No. 10,545,461 to Roper et al, which has been incorporated by reference herein. An additional phase may be an atom-transporting phase that stores and transports neutral atoms. Transport of neutral atoms is preferably via diffusion. At a fixed point in time, neutral atoms may be in the process of being transported into or out of the atom-transporting phase, may be stored at a fixed location within the atom-transporting phase, or may be moving within the atom-transporting phase but not across its phase boundary, and therefore stored within that phase. Transport of neutral atoms within the atom-transporting phase and/or across its phase boundaries may occur via various diffusion mechanisms, such as (but not limited to) bulk solid diffusion, porous diffusion, surface diffusion, grain boundary diffusion, permeation, solubility-diffusion, etc. Storage of neutral atoms is preferably via intercalation. Storage of neutral atoms also results when the diffusion rate of metal atoms is negligible (e.g., less than 10-10 $cm^2/s$).

In the atom-transporting phase of the second electrode, the selected metal atoms may have a diffusion coefficient of at least about $10^{-10}$ $cm^2/s$, $10^{-9}$ $cm^2/s$, $10^{-8}$ $cm^2/s$, $10^{-7}$ $cm^2/s$, $10^{-6}$ $cm^2/s$, or $10^{-5}$ $cm^2/s$, measured at the device-operation temperature, such as 25° C., 100° C., 150° C., or 200° C. The metal-atom diffusion in the second electrode as a whole will depend on the bulk diffusivity of the atom-transporting phase, the volume fraction of the atom-transporting phase, and the connectivity/tortuosity of atom-transporting phase.

The atomic species contained in the atom-transporting phase is preferably the reduced (neutral charge) form of at least one of the ionic species contained in the first ion conductor. Alternatively, or additionally, the atom-transporting phase may contain an atomic species that is different than the species contained in the first ion conductor. For example, when the device is configured to source atoms, Na may be contained within the atom-transporting phase, Na may be oxidized to $Na^+$ at the second electrode, $Rb^+$ may be reduced to Rb at the first electrode, and the first ion conductor may contain both $Na^+$ and $Rb^+$.

The atom-transporting phase and/or the second-electrode first phase preferably contain an intercalable compound that is capable of being intercalated by at least one element in ionic and/or neutral form. As used herein, an "intercalable compound" (or "intercalatable compound") is a host material that is capable of forming an intercalation compound with guest atoms which comprise the atomic vapor whose density is being controlled. Stated another way, the intercalable compound is intercalative for (capable of intercalating) at least some of the atoms in the atomic vapor. The guest atoms that are intercalated may be neutral atoms, ionic species, or a combination thereof. Typically, the guest atoms are intercalated as neutral atoms.

In some embodiments, the host material actually contains the guest species, resulting in a material which may be referred to as an "intercalation compound." It is noted that for the purposes of this patent application, any reference to intercalable compound may be replaced by intercalation compound, and vice-versa, since an intercalable compound must be capable of intercalating a guest species but may or may not actually contain the intercalated guest species.

"Intercalation" herein is not limited to the reversible inclusion or insertion of an atom, ion, or molecule sandwiched between layers present in a compound, which shall be referred to herein as "layer intercalation." Intercalation also includes absorption of neutral atoms or ionic species into a bulk phase of the compound, whether that phase is amorphous or crystalline; adsorption of neutral atoms or ionic species onto an outer surface or an internal surface (e.g., a phase boundary) present in the compound; and reversible chemical bonding between the neutral atoms or ionic species, and the compound.

Some embodiments of the invention utilize layer intercalation, in which a guest species such as K expands the van der Waals gap between sheets of a layered compound such as graphite. This layer expansion requires energy. Without being limited by theory, the energy may be supplied by electrical current to initiate charge transfer between the guest (e.g., K) and the host solid (e.g., graphite). In this example, potassium graphite compounds such as $KC_8$ and $KC_{24}$ may be formed. These compounds are reversible, so that when the electrical current is adjusted, the potassium graphite compounds may give up the intercalated atoms (K). Those previously intercalated atoms may be released into the vapor phase or into the first ion conductor, for example. Electrical energy may be supplied to cause a chemical potential change at the interface with the intercalable compound, which then causes layer expansion.

In some embodiments, the intercalable compound is a carbonaceous material, such as a material selected from the group consisting of graphite, graphite oxide, graphene, graphene oxide, holey graphene, graphene platelets, carbon nanotubes, fullerenes, activated carbon, coke, pitch coke, petroleum coke, carbon black, amorphous carbon, glassy carbon, pyrolyzed carbon-containing molecules, pyrolyzed parylene, polyaromatic hydrocarbons, and combinations thereof.

The intercalable carbonaceous material may be at least 50 wt % carbon, preferably at least 75 wt % carbon, more preferably at least 90 wt % carbon, most preferably at least 95 wt % carbon. In some embodiments, the carbonaceous material is essentially pure carbon, except for impurities. The carbonaceous material may include mesoporous carbon, microporous carbon, nanoporous carbon, or a combination thereof.

The intercalable carbonaceous material may be a form of predominately $sp^2$ bonded carbon. Examples of $sp^2$ bonded carbon include, but are not limited to, graphite, graphene, carbon nanotubes, carbon fibers, fullerenes (e.g. $C_{60}$ or $C_{70}$), pyrolyzed carbon-containing molecules or polymers (such as pyrolyzed parylene, e.g. parylene-N, parylene-C, or parylene-AF-4), and large polyaromatic hydrocarbons (e.g. pentacene, rubrene, hexabenzocoronene, or coronene). In the case of graphene (which is essentially a single layer of graphite), the graphene may be monolayer graphene or multiple layers of graphene. Graphene flakes (a few layers of graphene) may be utilized. Certain embodiments utilize monolayer holey graphene, multiple layers of holey graphene, or graphene platelets.

In certain embodiments, the carbonaceous material comprises graphite. Graphite consists of planes of carbon sheets. Metal atoms, especially alkali atoms, readily intercalate between these carbon sheets, leading to a high diffusivity for those atoms. Graphite electrodes enable fast metal transport at low voltages and low power consumption per atom removed. Graphite not only transports atoms via intercalation, but also is electrically conductive due to the electron delocalization within the carbon layers. Valence electrons in the carbon are free to move, thereby conducting electricity through the graphite.

The graphite may be natural graphite (e.g., mined graphite) or synthetic graphite produced from various techniques. For example, graphite may be obtained from chemical-vapor-deposited graphitic carbon, carbide-derived graphite, recycled graphite, waste from graphene manufacture, and so on. Crystalline flake graphite occurs as isolated, flat, plate-like particles with hexagonal edges if unbroken; when broken the edges can be irregular or angular. Amorphous graphite is very fine flake graphite. Lump graphite occurs in fissure veins or fractures and appears as massive platy intergrowths of fibrous or acicular crystalline aggregates. Highly oriented pyrolytic graphite is graphite with an angular spread between the graphite sheets of less than 1°.

The graphite may be crystalline, amorphous, or a combination thereof. The graphite crystallinity may range from about 10% to about 90%, for example. A mixture of crystalline and amorphous graphite may be beneficial for intercalation not only between crystal layers but also between crystalline and amorphous regions of the graphite. With too much crystallinity, the diffusivity becomes highly anisotropic. If highly crystalline (i.e. highly anisotropic) graphite is oriented with the low-diffusivity axis normal to the surface of the device (which is a typical orientation), reduced alkali flux, and thus reduced performance, would result.

In some embodiments, the intercalable compound of the atom-transporting phase is a transition-metal oxide, a transition-metal dichalcogenide, or a combination thereof. The intercalable compound may also be a mixture of a carbonaceous material and a transition-metal oxide, or a mixture of a carbonaceous material and a transition-metal dichalcogenide, or a mixture of all of these materials. Specifically, the intercalable compound may be a metal dichalcogenide selected from $MoS_2$, $TaS_2$, $TiTe_2$, or any other transition metal dioxide, disulfide, diselenide, or ditelluride.

The second electrode is preferably encapsulated by the first ion conductor and one or more reservoir walls. The encapsulation may be a single encapsulate (e.g., UHV epoxy) or a bonded substrate employing UHV epoxy or thermocompression-bonded silicon, borosilicate glass, or alumina die, for example.

The first ion conductor preferably has high ionic conductivity for a selected ionic species. The ionic conductivity is preferably at least $10^{-7}$ S/cm, and more preferably at least $10^5$ S/cm, measured at 25° C. or at a device operating temperature. The ionic species may be an ionized form of an atom of interest in atomic physics and atomic measurement instruments. In various embodiments, the ionic species is selected from the group consisting of $Li^+$, $Na^+$, $K^+$, $Rb^+$, $Cs^+$, $Sr^+$, $Sr^{2+}$, $Ca^+$, $Ca^{2+}$, $Ba^+$, $Yb^{2+}$, $Yb^{3+}$, $Hg^+$, $Hg^{2+}$, and combinations thereof (i.e., multiple ions may be present in the device).

The first ion conductor preferably includes a solid electrolyte. For example, the first ion conductor may be a large fraction (>50% by weight) β-alumina, β"-alumina, or a combination of β-alumina and β"-alumina. β-alumina and β"-alumina are good conductors of their mobile ions yet allow negligible non-ionic (i.e., electronic) conductivity. β"-alumina is a hard polycrystalline or monocrystalline ceramic material. β-alumina and/or β"-alumina are also referred to herein as "beta-alumina." When prepared as a solid electrolyte, beta-alumina is complexed with a mobile ion, such as $Na^+$, $K^+$, $Li^+$, $Rb^+$, $Cs^+$, $Sr^{2+}$, or $Ca^{2+}$, in which case the material becomes sodium-beta-alumina, potassium-beta-alumina, lithium-beta-alumina, rubidium-beta-alumina, cesium-beta-alumina, strontium-beta-alumina, or calcium-beta-alumina, respectively.

Other possible solid electrolyte materials for the first ion conductor include yttria-stabilized zirconia, NASICON, LISICON, KSICON, alkali-ion-exchanged versions thereof, and combinations of any of the foregoing. In these or other embodiments, chalcogenide glasses may be used as solid electrolyte materials for the first ion conductor. Exemplary chalcogenide glasses include, but are not limited to, RbI—$GeSe_2$—$Ga_2Ge_3$ and CsI—$GeSe_2$—$Ga_2Ge_3$.

The atomic-beam source device may include an atom reservoir that is distinct from the second electrode/reservoir. This additional atom reservoir is preferably in contact with the second electrode. The atom reservoir may be comprised, in part or in whole, by graphite or graphitic carbon. The graphite or graphitic carbon provides electrical conductivity and also a means of storing atoms, such as in a graphite intercalation compound.

The atom reservoir may contain metal in the vapor phase and possibly in solid and/or liquid phases as well. The atomic species contained within the atom reservoir is preferably the reduced form of the same ionic species as in the first ion conductor. Alternatively, a different atomic species may be contained within the atom reservoir.

The atom reservoir and/or the second electrode may be designed to accommodate any mechanical strain from a changing reservoir volume due to the loss or introduction of atoms. For instance, a gap may be situated between an intercalation compound and the reservoir walls to permit expansion of the intercalation compound without straining the reservoir walls. The reservoir walls may be designed to elastically and/or plastically deform. This configuration may be accomplished through material selection (e.g. metals, polymers, or a combination thereof). Alternatively, or additionally, this configuration may be accomplished through reservoir design (e.g. a bellows).

The atom reservoir and/or the second electrode has walls that are preferably impermeable to the atomic species contained inside the reservoir. The walls are preferably thin films and supported by a substrate (e.g. glass, Si, alumina, etc.). The side(s) of the reservoir walls that face the interior of the reservoir preferably do not chemically interact with the ionic species. For example, the reservoir walls do not form an intermetallic phase with the ionic species and do not chemically react with the ionic species. Exemplary reservoir wall materials include Pt, Mo, W, or a combination thereof, for the walls that face the interior of the reservoir. When there are side(s) of the reservoir walls that touch the first ion conductor, the reservoir walls preferably do not chemically interact with the first ion conductor, other than chemical bonding to adhere to the first ion conductor. Exemplary reservoir wall materials include Pt, Mo, W, or a combination thereof, for the walls (if any) that touch the first ion conductor.

Multiple ion conductors, each with their own electrodes, may be present in a single device. Multiple first electrodes may or may not be electrically connected through electrical leads or electrical traces. Likewise, multiple second electrodes may or may not be electrically connected through electrical leads or electrical traces.

Multiple sets of first electrodes, ion conductors, and second electrodes may generally be present. In some embodiments, two or more first (front) electrodes are employed. In these or other embodiments, two or more second (back) electrodes are employed. In any of these embodiments, or other embodiments, two or more ion conductors are employed.

Each electrode is typically connected to an electrical lead fabricated from an electrically conductive material. A lead is an electrical connection consisting of a length of wire, metal pad, metal trace, or other electrically conductive structure. Leads are used to transfer power and may also provide physical support and potentially provide a heat sink. In some embodiments, a device is provided without such leads, which may be added at a later time, before use.

There are many options for the electrical connections to the first and second electrodes of the atomic-beam source device. The electrical connections may be connected to bond pads for connection to an external circuit. The electrical connections may include through-wafer vias, patterned electrically conductive thin films, doped regions of semiconductors, wire bonds, or a combination thereof. Patterned thin films may be parallel with the first electrode, such as when the first electrode is substantially flat. Parts of patterned thin films may be at an angle with the first electrode. In some embodiments, the electrode connections travel out of the plane of the electrode to which it is connected.

The atomic-beam source device may be contained within an oven. The purpose of the oven may be to control the temperature of the device at a temperature above the ambient temperature, for example. In principle, the atomic-beam source device may be contained within any sort of temperature-controlled system, for heating or cooling the device.

Ions leaving the ion trap may be collected by an ion sink for recycling. The ion sink is an optional component. The ion sink may be positioned on the output port of the ion trap to collect the ion beam after use. The ion sink may be an electrochemical solid-state atom sink, which may be similar to an electrochemical solid-state atom source but designed to act as an atom sink. In certain embodiments, the atom source is repurposed as an ion sink, which may significantly increase the lifetime of the device. For example, upon depletion of the atom source, the ion sink may be repurposed as the new source, directing an atom beam in the opposite direction along the ion trap. The ion beam may then be collected by the original atom source (now itself repurposed as an ion sink).

Other implementations of an atom sink include, but are not limited to, a graphite intercalation compound, a mixture of the atomic species with alkali or alkaline earth metals, or a cold surface. The atom sink, once it contains a high amount of absorbed, adsorbed, or intercalated atoms, may then be heated to release the atomic species of interest. The initial atom source may be cooled to turn it into an atom sink, thereby reversing the flow of atoms and ions, permitting reuse of atoms, and enabling a longer device lifetime and/or a smaller atom source size.

The atomic-beam source device may be operated at a wide range of temperatures and pressures. In various embodiments, the atomic-beam source device may be operated at a temperature from about −200° C. to about 500° C., preferably from about −50° C. to about 250° C., and more preferably from about 10° C. to about 200° C. After atoms are emitted from the atomic-beam source device, those atoms may be cooled to ultra-low temperatures (e.g., $10^{-7}$ K to $10^{-3}$ K) as needed for some applications or measurements. In various embodiments, the atomic-beam source device may be operated at a pressure from about 7600 torr (10 atm) to about $10^{-14}$ torr, preferably from about $10^{-3}$ to about $10^{-13}$ torr, and more preferably from about $10^{-7}$ torr to about $10^{-12}$ torr.

The atomic-beam source device may include an integrated heater. The integrated heater may be a resistive heater, such as a thin wire or a patterned thin metal trace (e.g. Pt or nickel-chromium alloy). The integrated heater may also be a radiative heater or a thermoelectric heater, for example. The integrated heater preferably includes a temperature sensor, such as a thermocouple or a resistance temperature detector (e.g., Pt). Preferably, the heater is in good thermal communication with the region of the first ion conductor that is near the first electrode.

In some embodiments, the atomic-beam source device is a chip-scale device that is mounted or integrated on a microelectromechanical systems (MEMS) heater stage to minimize heater power.

When an integrated heater is included in the device, the heater may further comprise one or more thermal isolation structures. A thermal isolation structure minimizes heat transfer from the heated region of the device to the colder, ambient environment. A thermal isolation structure is configured to minimize heat loss out of the heated region into a cold region, by functioning as insulation to retain heat within the heated region. The thermal isolation structure preferably has a high value of thermal resistance, as further explained below.

A thermal isolation structure may be made of the same material and layer as the atom reservoir walls, in some embodiments. In these or other embodiments, a thermal isolation structure may be made of the same material and layer as the first ion conductor. The thermal isolation structure is preferably polymer, ceramic, or glass, although metal may be utilized as well, or a combination of the foregoing.

In some embodiments, the thermal isolation structure is fabricated from a material selected from the group consisting of β-alumina (e.g., Rb-β-alumina, Na-β-alumina, or Sr-β-alumina), β"-alumina (e.g., Rb-β"-alumina, Na-β"-alumina, or Sr-β"-alumina), α-alumina, silica, fused silica, quartz, borosilicate glass, silicon, silicon nitride, silicon carbide, and combinations thereof.

The thermal isolation structure may be designed to accommodate materials with any thermal conductivity. High-thermal-conductivity materials will benefit from long, high-aspect ratio connections, while lower-thermal-conductivity materials may utilize shorter, stubbier connections.

An important design parameter for the thermal isolation structure (when present) is the thermal resistance. The thermal resistance is the temperature difference across the thermal isolation structure when a unit of heat energy flows through it in unit time; or equivalently, the temperature difference, at steady state, between two defined surfaces of the thermal isolation structure that induces a unit heat flow rate. Because the desire is for a low heat flow rate, a high temperature difference is desired, i.e., a high value of thermal resistance. The thermal resistance of a thermal isolation structure is preferably at least 100 K/W, more preferably at least 1,000 K/W, and most preferably at least 10,000 K/W.

A thermal isolation structure may also be configured to impart mechanical strain relief, thereby preventing mechanical damage due to thermal strains that build up when the first ion conductor is heated to a higher temperature than the base substrate. In some embodiments, a thermal isolation structure is mechanically connected to a base substrate, for example through a frame. Preferably, the thermal isolation structure is designed to reduce thermal stress or residual stress by at least 2×, preferably at least 10×, and more preferably at least 100× from one side of the thermal isolation structure to the other side. The thermal or residual stress reduction is not an inherent material property, but is a function of the geometric design of the thermal isolation structure and its material properties.

In some embodiments, a thermal isolation structure is a suspension beam. Typically, a plurality of suspension beams will be present to connect the heated region to the cold region. The heated region only contacts the cold region through the suspension beams. The suspension beams may be straight beams, folded beams, tortuous beams, circular beams, and so on. The suspension beams may be made in any one (or more) layers in a planar process, such as surface or bulk micromachining. The rest of the heated region may be surrounded by vacuum or a vapor phase (e.g., containing an inert gas), either of which has a high thermal resistance to the cold region. As an alternative, the vapor/vacuum region may include a thermal insulator material, such as an aerogel.

In some embodiments, a thermal isolation structure has a thin metal film patterned on it for electrical interconnections. In some preferred embodiments, a resistive heater and a temperature sensor are patterned on (in contact with) the same layer as at least one thermal isolation structure. Preferably, electrical connections to the heater and the temperature sensor are also patterned on one or more thermal isolation structures. Optionally, part or all of the heater may be patterned on a thermal isolation structure or on multiple thermal isolation structures. In some embodiments, a thin film resistive heater is patterned on one or more sides of the same layer as a thermal isolation structure. In cases where the first ion conductor is separate from the thermal isolation structure, the heater may be patterned on the same side or the opposite side of the thermal isolation structure compared to the position of the first ion conductor. In cases where the first ion conductor is the same as a thermal isolation structure, or a layer thereof, the heater may be patterned on either side of the first ion conductor (i.e. on the first-electrode side and/or on the second-electrode side). See commonly owned U.S. patent application Ser. No. 16/573,684, filed on Sep. 17, 2019, which is hereby incorporated by reference herein.

The integration of the heater and thermal isolation structures within the system enables low system power input. The system power input for controlling vapor density of metal atoms is preferably less than about 500 mW, more preferably less than about 200 mW, and most preferably less than about 100 mW. In various embodiments, the system power input for sourcing and/or sinking metal atoms is about 1000, 500, 400, 300, 200, 100, 50, 25, or 10 mW.

In some embodiments in which high vapor density is desirable, the density of metal atoms may be at least $10^9$ atoms per $cm^3$, preferably at least $10^{10}$ per $cm^3$, and more preferably at least $10^{11}$ per $cm^3$. In some embodiments in which low vapor density is desirable, the density of metal atoms may be below $10^8$ atoms per $cm^3$, preferably below $10^7$ atoms per $cm^3$. In various embodiments, the density of metal atoms if about, at least about, or at most about $10^6$ atoms per $cm^3$, $10^7$ atoms per $cm^3$, $10^8$ atoms per $cm^3$, $10^9$ atoms per $cm^3$, $10^{10}$ atoms per $cm^3$, $10^{11}$ atoms per $cm^3$, or $10^{12}$ atoms per $cm^3$.

The atomic-beam source device may be fabricated on a wide variety of length scales. The length scale may be characterized by the square root of the first electrode area. This length scale may vary from 10 m to 1 micron, with 1 m to 10 mm being typical for macroscale atomic timing and navigation systems, and 30 mm to 10 microns being typical for chip-scale atomic timing and navigation systems.

Chip-scale devices are preferably constructed using microfabrication techniques, including some or all of lithography, evaporation, shadow-masking, evaporation, sputtering, wafer bonding, die bonding, anodic bonding, glass frit bonding, metal-metal bonding, and etching.

This disclosure hereby incorporates by reference herein the following patents for teaching solid-state electrochemical atom sources that are used in some embodiments, as atom sources and/or atom sinks: U.S. Pat. No. 9,763,314, issued Sep. 12, 2017; U.S. Pat. No. 9,837,177, issued Dec. 5, 2017; U.S. Pat. No. 10,056,913, issued Aug. 21, 2018; U.S. Pat. No. 10,545,461, issued Jan. 28, 2020; U.S. Pat. No. 10,775,748, issued Sep. 15, 2020; U.S. Pat. No. 10,828,618, issued Nov. 10, 2020; and U.S. Pat. No. 11,101,809, issued Aug. 24, 2021. All publications, patents, and patent applications cited in this specification are herein incorporated by reference in their entirety as if each publication, patent, or patent application were specifically and individually put forth herein.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An ion trap comprising a plurality of structurally continuous blades and a plurality of recessed control electrodes that are capable of controlling ions, wherein said plurality of structurally continuous blades includes at least two structurally continuous RF blades and at least two structurally continuous DC blades, wherein said recessed control electrodes are disposed on or within said structurally continuous blades, and wherein said ion trap is in a ring configuration.

2. The ion trap of claim 1, wherein said ring configuration contains two or more straightaway sections connected in a loop by rounded end sections.

3. The ion trap of claim 1, wherein said plurality of structurally continuous blades is four structurally continuous blades consisting of two structurally continuous RF blades and two structurally continuous DC blades.

4. The ion trap of claim 1, wherein two of said plurality of structurally continuous blades have blade tips with a blade-tip distance therebetween from about 1 micron to about 1 centimeter.

5. The ion trap of claim 4, wherein said blade-tip distance is from about 10 microns to about 1 millimeter.

6. The ion trap of claim 1, wherein said structurally continuous blades are created from printed-circuit-board wafers, ceramic wafers, semiconducting wafers, insulating wafers, glass, or a combination thereof.

7. The ion trap of claim 1, wherein said ion trap has a trap length from about 1 millimeter to about 1 meter.

8. The ion trap of claim 7, wherein said trap length is from about 1 centimeter to about 100 centimeters.

9. The ion trap of claim 1, wherein said ions are present and are in continuous transport within said ion trap around said ring configuration.

10. The ion trap of claim 1, wherein said ions are present and are stationary within said ion trap.

11. The ion trap of claim 1, wherein said ions are positive ions with a charge of +1.

12. The ion trap of claim 11, wherein said positive ions are selected from the group consisting of $Ca^+$, $Sr^+$, $Ba^+$, $Yb^+$, isotopes thereof, and combinations of the foregoing.

13. The ion trap of claim 1, wherein said ions are positive ions with a charge of +2 or greater.

14. The ion trap of claim 1, wherein said ions are negative ions with a charge of −1.

15. The ion trap of claim 14, wherein said negative ions are $S^-$ and/or $Se^-$.

16. The ion trap of claim 1, wherein said ions are negative ions with a charge of −2 or more negative.

17. The ion trap of claim 1, wherein said ion trap is configured to interrogate internal electronic, vibrational, and/or spin states of said ions via lasers.

18. The ion trap of claim 1, wherein said ion trap further comprises at least two probe lasers.

19. The ion trap of claim 18, wherein said at least two probe lasers are configured for Ramsey spectroscopy of said ions.

20. The ion trap of claim 1, wherein said ion trap further comprises at least one cooling laser configured to cool said ions.

21. The ion trap of claim 1, wherein said ion trap further comprises at least one laser configured for electron shelving.

22. The ion trap of claim 1, wherein said ion trap further comprises an ion collimator configured to form a collimated beam of said ions.

23. The ion trap of claim 1, wherein said ion trap further comprises an atom source configured to supply neutral atoms to be ionized.

24. The ion trap of claim 23, wherein said ion trap further comprises an ionizer configured to excite neutral atoms in said atom source to form said ions.

25. The ion trap of claim 24, wherein said ionizer is an optical ionizer.

26. The ion trap of claim 24, wherein said ionizer is an electrical ionizer.

27. The ion trap of claim 23, wherein said atom source is a solid-state electrochemical atom source.

28. The ion trap of claim 1, wherein said ion trap further comprises an ion sink.

29. The ion trap of claim 28, wherein said ion sink is a solid-state electrochemical ion sink.

30. The ion trap of claim 1, wherein said ion trap further comprises an imaging system.

31. The ion trap of claim 1, wherein said ion trap is disposed within a vacuum chamber.

32. An atomic clock comprising the ion trap of claim 1.

33. An atomic sensor comprising the ion trap of claim 1.

34. A mass spectrometer comprising the ion trap of claim 1.

35. A quantum computer comprising the ion trap of claim 1.

36. The quantum computer of claim 35, wherein said quantum computer is an error-corrected quantum computer.

\* \* \* \* \*